United States Patent
Nakajima et al.

(10) Patent No.: US 10,627,921 B2
(45) Date of Patent: Apr. 21, 2020

(54) PEN TABLET, HANDWRITTEN DATA RECORDING DEVICE, HANDWRITTEN DATA DRAWING METHOD, AND HANDWRITTEN DATA SYNTHESIS METHOD

(71) Applicant: Wacom Co., Ltd., Saitama (JP)

(72) Inventors: Yukio Nakajima, Saitama (JP); Konstantin Angelov, Plovdiv (BG); Vladimir Blazhev, Sofia (BG); Tanya Dimitrova, Sofia (BG)

(73) Assignee: Wacom Co., Ltd., Saitama (JP)

( * ) Notice: Subject to any disclaimer, the term of this patent is extended or adjusted under 35 U.S.C. 154(b) by 138 days.

(21) Appl. No.: 15/842,259

(22) Filed: Dec. 14, 2017

(65) Prior Publication Data

US 2018/0181221 A1 Jun. 28, 2018

(30) Foreign Application Priority Data

Dec. 28, 2016 (JP) ................................ 2016-255229

(51) Int. Cl.
*G06F 3/0354* (2013.01)
*G06F 3/01* (2006.01)
(Continued)

(52) U.S. Cl.
CPC .......... *G06F 3/03545* (2013.01); *G06F 3/017* (2013.01); *G06F 3/038* (2013.01);
(Continued)

(58) Field of Classification Search
CPC .. G06F 3/03545; G06F 3/03547; G06F 3/038; G06F 3/04883; G06F 3/017; G06F 17/21; G06T 11/00
See application file for complete search history.

(56) References Cited

U.S. PATENT DOCUMENTS

| | | | | |
|---|---|---|---|---|
| 2002/0054377 A1* | 5/2002 | Ouchi | ..................... | G06F 3/041 358/478 |
| 2014/0075302 A1* | 3/2014 | Akashi | ................... | G06K 9/222 715/268 |

(Continued)

FOREIGN PATENT DOCUMENTS

JP 6005880 B1 10/2016

*Primary Examiner* — Alexander Eisen
*Assistant Examiner* — Kebede T Teshome
(74) *Attorney, Agent, or Firm* — Seed IP Law Group LLP

(57) ABSTRACT

A pen tablet capable of detecting a position of a stylus and supplying positional coordinates to an external computer is provided. The pen tablet includes a detector that generates hover coordinates as the positional coordinates in a hover state and generates contact coordinates as the positional coordinates in a contact state. The pen table includes a communicator that performs communication with a device driver and a given application executed by the external computer, a storage device, and a controller. The controller determines whether the communication with the device driver is requested of the communicator, operates in a tablet mode, for supplying the hover coordinates and the contact coordinates to the device driver, when the communication is requested, and operates in a paper mode, for discarding at least part of the hover coordinates and recording stroke data generated based on the contact coordinates in the storage device, when the communication is not requested.

20 Claims, 15 Drawing Sheets

(51) Int. Cl.
*G06F 3/0488* (2013.01)
*G06F 3/041* (2006.01)
*G06F 3/038* (2013.01)
*G06F 40/171* (2020.01)

(52) U.S. Cl.
CPC ........ *G06F 3/03547* (2013.01); *G06F 3/0416* (2013.01); *G06F 3/04883* (2013.01); *G06F 40/171* (2020.01)

(56) References Cited

U.S. PATENT DOCUMENTS

2015/0002424 A1* 1/2015 Yamamoto .......... G06F 3/04883
 345/173
2015/0160851 A1* 6/2015 Michihata ........... G06F 3/04883
 345/174

* cited by examiner

TABLET MODE

PAPER MODE (SEPARATE USE)

PAPER MODE (CONNECTED TO COMPUTER)

FIG.5

```
                              43      P L
                              ┌───────────────────┐
                              │ DN(X,Y,PR,SW1,SW2,T,1,1) │
                              │ MV(X,Y,PR,SW1,SW2,T,1,1) │
                              │ MV(X,Y,PR,SW1,SW2,T,1,1) │ ST1
                              │ MV(X,Y,PR,SW1,SW2,T,1,1) │         Layer 1-1    Page 1
                              │ UP(X,Y,PR,SW1,SW2,T,1,1) │
                              │ DN(X,Y,PR,SW1,SW2,T,1,1) │
                              │ MV(X,Y,PR,SW1,SW2,T,1,1) │ ST2
                              │ UP(X,Y,PR,SW1,SW2,T,1,1) │
                              ├───────────────────┤
                              │ DN(X,Y,PR,SW1,SW2,T,2,1) │
                              │ MV(X,Y,PR,SW1,SW2,T,2,1) │ ST3
                              │ UP(X,Y,PR,SW1,SW2,T,2,1) │
                              │ DN(X,Y,PR,SW1,SW2,T,2,1) │         Layer 2-1
                              │ MV(X,Y,PR,SW1,SW2,T,2,1) │
                              │ MV(X,Y,PR,SW1,SW2,T,2,1) │ ST4
                              │ UP(X,Y,PR,SW1,SW2,T,2,1) │
                              │ DN(X,Y,PR,SW1,SW2,T,2,2) │
                              │ MV(X,Y,PR,SW1,SW2,T,2,2) │
                              │ MV(X,Y,PR,SW1,SW2,T,2,2) │ ST5    Layer 2-2    Page 2
                              │ MV(X,Y,PR,SW1,SW2,T,2,2) │
                              │ UP(X,Y,PR,SW1,SW2,T,2,2) │
                              │ DN(X,Y,PR,SW1,SW2,T,2,3) │
                              │ MV(X,Y,PR,SW1,SW2,T,2,3) │
                              │ MV(X,Y,PR,SW1,SW2,T,2,3) │ ST6
                              │ UP(X,Y,PR,SW1,SW2,T,2,3) │         Layer 2-3
                              │ DN(X,Y,PR,SW1,SW2,T,2,3) │
                              │ MV(X,Y,PR,SW1,SW2,T,2,3) │ ST7
                              │ UP(X,Y,PR,SW1,SW2,T,2,3) │
                              ├───────────────────┤
                              │ DN(X,Y,PR,SW1,SW2,T,3,1) │
                              │ MV(X,Y,PR,SW1,SW2,T,3,1) │
                              │ MV(X,Y,PR,SW1,SW2,T,3,1) │ ST8    Layer 3-1    Page 3
                              │ MV(X,Y,PR,SW1,SW2,T,3,1) │
                              │ UP(X,Y,PR,SW1,SW2,T,3,1) │
                              │ DN(X,Y,PR,SW1,SW2,T,3,1) │
                              │         ⋮          │
                              └───────────────────┘
```

FIG. 8

PEN TABLET, HANDWRITTEN DATA RECORDING DEVICE, HANDWRITTEN DATA DRAWING METHOD, AND HANDWRITTEN DATA SYNTHESIS METHOD

BACKGROUND OF THE INVENTION

1. Field of the Invention

The present invention relates to a pen tablet, a handwritten data recording device, a handwritten data drawing method, and a handwritten data synthesis method.

2. Description of the Related Art

Pen tablets are known, which supply positions indicated by a pointer to a computer. A pen tablet is a type of human-interface device (HID), which supplies a user's current input data to an input target device, namely, a computer, similarly to a mouse, keyboard, etc. A pen tablet has a function of periodically acquiring positional coordinates of a stylus and an operational status of an operation element (e.g., a depressed state of a side switch) of the stylus, based on an electromagnetic induction method, an active capacitive method, etc. A pen tablet generates report data including acquired positional coordinates and operational status, and provides the generated report data, via a communication interface according to universal serial bus (USB), inter-integrated circuit ($I^2C$), etc., to a device driver of a computer (e.g., an HID device driver according to a given operating system (OS), a tablet's device driver specific to each pen tablet device vendor, etc., hereinafter collectively referred to as a "device driver"). The computer uses the provided report data for various purposes. For example, the computer may use the positional coordinates included in the report data as a position of an arrow-shaped cursor displayed on the desktop of the operating system on the computer, may associate the side switch's depressed state included in the report data with a mouse click operation, may supply the report data as "event data" to an application such as a drawing application, on which the desktop is currently focused, and so forth.

Recently, there are handwritten data recording devices capable of recording handwritten data (hereinafter referred to as "stroke data") corresponding to what is hand-drawn by a user on a paper medium by use of a stylus with ink or pencil powder, wherein the stylus functions as an ink pen or a pencil and also functions as an electronic stylus employing an electromagnetic induction method. Japanese Patent No. 6005880 discloses an example of such handwritten data recording device and a computer to which the handwritten data recording device is connected. The handwritten data recording device is used for the purpose of supplying the stroke data corresponding to what is hand-drawn on a paper medium to an external computer, and not for the purpose of operating the external computer itself. Thus, the handwritten data recording device may be used independently without being connected to a computer. Briefly, the handwritten data recording device is used like a backing sheet laid under a paper medium. The handwritten data recording device accumulates the stroke data each time a handwritten stroke is drawn on the paper medium, and supplies the accumulated stroke data to a computer having a display device, such as a smartphone, via a communications link when the handwritten data recording device is subsequently connected to the computer.

In the handwritten data recording device, the stroke data needs to be recorded as divided among digital pages respectively corresponding to pages of the paper medium. Otherwise, hand-drawn strokes respectively written on multiple pages of the paper medium are erroneously superimposed together and displayed on one page on a display screen of a handwritten data drawing device.

Japanese Patent No. 6005880 discloses a technology which allows for dividing (classifying) the handwritten data into multiple pages, without burdening the user and with light processing required for the handwritten data drawing device to draw the handwritten data supplied from the handwritten data recording device.

SUMMARY OF THE INVENTION

The inventors of the present application have developed a pen tablet equipped with a function of the handwritten data recording device. In the following description, (1) an operation mode in which the pen tablet performs the operation of supplying the report data to a device driver of an external computer in real time similarly to the conventional pen tablets will be referred to as a "tablet mode," and (2) an operation mode in which the pen tablet generates and records the stroke data based on the positional coordinates will be referred to as a "paper mode." With a pen tablet capable of operating in these two operation modes, a pen tablet conventionally used as a peripheral device of a computer can be used as a handwritten data recording device, such as the handwritten data recording device described in Japanese Patent No. 6005880, independently of the computer (e.g., as a portable device).

Technical challenges associated with the pen tablet operating in the two modes—the tablet mode and the paper mode—will be described below.

The first is a challenge regarding the storage capacity of the pen tablet. In order to operate in the paper mode, the pen tablet needs to have an internal storage device for recording the stroke data. Here, the controller of the pen tablet performs an operation of generating tens to hundreds of pieces of report data per second, irrespective of whether the stylus is in a state in which the stylus tip is in contact with an object such as a paper medium to leave a handwritten trace thereon (hereinafter referred to as a "contact state") or in a state in which the stylus is moving above the paper medium (hereinafter referred to as a "hover state"). The positional coordinates in the hover state (hereinafter referred to as "hover coordinates") are data that cannot be discarded in the tablet mode of supplying the report data to the device driver of a computer in real time. However, the storage capacity of a storage device is exhausted if all the hover coordinates are recorded in the same way as the positional coordinates in the contact state (hereinafter referred to as "contact coordinates").

The second is a challenge with the pen tablet when used in the paper mode. Users of conventional pen tablets include professional illustrators and the like who digitally draw pictures using drawing software. There are many drawing software programs which allow for separation into layers such as a layer for making a rough sketch and a layer for inking the rough sketch. To give to these users an operational feel as with layers supported by the drawing software programs, it is desirable to design the pen tablet to be capable of retaining the stroke data in units that are similar to the layers supported by the drawing software programs. However, sometimes the pen tablet is not connected to a display device (computer), such as when the pen tablet operates in the paper mode. In such cases, it is difficult to allow the user recognize which layer is the current object (target) of the drawing process. Accordingly, when the user operates the pen tablet without a display device, it is necessary to record the stroke data in such a way that each piece of stroke data can be associated with a page and a layer afterwards in the drawing software program.

The third is a challenge that occurs on the side of the computer performing the drawing process on the stroke data supplied from the pen tablet, if the pen tablet, in order to address the second challenge discussed above, updates a page and a provisional layer associated with the stroke data to a new page and a new provisional layer depending on the type of user operation. When the user operates the pen tablet with no display device, the user is required to perform a provisional layer update operation each time the user performs a handwriting operation that should be separated from a previous handwriting operation. The number of provisional layers generated this way is larger than the number of layers used in the drawing application program, and tens of provisional layers can be generated in one page, for example. If the computer drawing the handwritten data processes one provisional layer as one layer, assuming that one page includes N layers, when an n-th layer included in the N layers needs to be edited, the computer must perform a layer synthesis calculation N−1 times each time an operation is performed on the n-th layer. This calculation process is computationally extensive and the processing load on the computer becomes excessive. Accordingly, it is necessary to lighten the load on the computer when processing handwritten data having a layer structure.

The fourth is also a challenge on the computer's side. The fourth problem is that handwritten data that have been classified into pages or provisional layers cannot be combined again into one page or layer. The classification of the handwritten data into pages or provisional layers is implemented by a user operation of depressing a hardware button while the user is performing a handwriting operation on the pen tablet's side. Since the user cannot check how the pages or provisional layers are organized when depressing the hardware button, a delimiter may be inserted at an inappropriate position between provisional layers in the drawing software. It is desirable to offer an easy method that permits combining handwritten data associated with multiple provisional layers into one original layer on the computer's side.

An aspect of the present invention is to address the above-described challenges and thereby make it possible to provide a pen tablet having the function of a handwritten data drawing device.

A pen tablet according to a first aspect of the present invention is capable of detecting a position of a stylus and supplying positional coordinates to an external computer. The pen tablet includes a detector that identifies and detects whether the stylus is in a contact state or a hover state, and generates hover coordinates as the positional coordinates of the stylus in the hover state and contact coordinates as the positional coordinates of the stylus in the contact state. The pen tablet also includes a communicator that performs communication with a device driver and with a given application executed by the external computer, a storage device, and a controller. The controller performs the following: determining whether or not the communication with the device driver executed by the external computer is requested of the communicator; operating in a first mode, for supplying the hover coordinates and the contact coordinates to the device driver, when the communication with the device driver is requested; and operating in a second mode, for discarding at least part of the hover coordinates and recording stroke data generated based on the contact coordinates in the storage device, when the communication with the device driver is not requested.

A handwritten data recording device according to a second aspect of the present invention is used with a stylus. The handwritten data recording device includes a detector that detects whether or not the stylus is in a contact state and generates contact coordinates representing a position of the stylus in the contact state, a storage device, an operational element that receives a first operation for updating a group of stroke data and a second operation for updating a subgroup of stroke data as a subset of the group, and a processor. The processor performs the following: generating stroke data in units of consecutive contact coordinates; accumulating the generated stroke data in the storage device in association with the current group and the current subgroup; updating the current group and the current subgroup to a new group and a new subgroup in response to the operational element receiving the first operation; and updating the current subgroup to a new subgroup in response to the operational element receiving the second operation.

A handwritten data drawing method according to a third aspect of the present invention is to be executed by a computer performing a drawing method based on coordinate data corresponding to a position of a stylus according to stroke data supplied from a handwritten data recording device. The handwritten data recording device includes a detector that detects a coordinate data set corresponding to positions indicated by the stylus from when the stylus is in contact with the detector to when the stylus is separated from the detector, a nonvolatile memory, and an operational element that receives a first operation corresponding to a group of stroke data in units of the coordinate data sets and a second operation corresponding to a subgroup as a subset of the group. The handwritten data recording device also includes a processor that accumulates the coordinate data sets detected by the detector in the nonvolatile memory, while successively generating, based on the coordinate data sets accumulated in the nonvolatile memory, first stroke data, which belongs to a first group and a first subgroup as a subset of the first group, and second stroke data. The processor performs the following: associating the second stroke data with the first group and the first subgroup when neither the first operation nor the second operation is received by the operational element after the start of generating the first stroke data and before the start of generating the second stroke data; associating the second stroke data with a second group different from the first group and a second subgroup as a subset of the second group when the first operation is received by the operational element after the start of generating the first stroke data and before the start of generating the second stroke data; and associating the second stroke data with the first group and a third subgroup which is a subset of the first group and different from the first subgroup when the first operation is not received but the second operation is received by the operational element after the start of generating the first stroke data and before the start of generating the second stroke data. The handwritten data drawing method includes a step of establishing communication between the computer and the handwritten data recording device, a step of, by the computer, acquiring the first and second stroke data and the group and the subgroup associated with each of the first and second stroke data from the handwritten data recording device via the communication, a step of, by the computer, generating first image data by rendering the first stroke data, a step of, by the computer, generating second image data by rendering the second stroke data, and a step of, by the computer, performing a drawing process so as to overlay the second image data on the first image data when both of the first and second stroke data belong to the first group or performing a drawing process of only the first or second image data when the first stroke data belongs to the first group and the second stroke data belongs to the second group. In the handwritten data drawing method, the group may be a page, and the subgroup may be a layer. The handwritten data drawing method further includes: a step of acquiring stroke data sets respectively belonging to N layers from a first layer generated the earliest in time to an N-th layer generated the last in time; a step of receiving specification of an n-th layer included in the N layers; a first aggregation step of generating first synthetic image data by rendering stroke data sets included in all layers generated before the n-th layer in time; a second aggregation step of generating second synthetic image data by rendering stroke data sets included in all layers generated after the n-th layer in time; and a rendering step of performing rendering of the N layers upon each detection of an editing operation on the n-th layer. The rendering step includes: i) a step of generating edited image data by performing the detected editing operation on the stroke data set belonging to the n-th layer, and ii) a step of performing drawing of the N layers by overlaying the edited image data on the first synthetic image data and overlaying the second synthetic image data on the image obtained as a result of said overlaying.

A handwritten data synthesis method according to a fourth aspect of the present invention includes a step of acquiring stroke data sets respectively belonging to N layers from a first layer generated the earliest in time to an N-th layer generated the last in time, a step of receiving specification of an n-th layer included in the N layers, a step of receiving a merge operation, and a layer synthesis step of associating the stroke data sets in the n-th layer and in an (n− 1)-th layer of the N layers with one of the (n− 1)-th layer and the n-th layer, while maintaining the order of the n-th layer and the (n−1)-th layer and deleting the other of the (n−1)-th layer and the n-th layer.

According to the present invention, the pen tablet operates in the two operation modes: (1) the tablet mode in which the pen tablet performs the operation of supplying the report data to a device driver of an external computer in real time similarly to the conventional pen tablets and (2) the paper mode in which the pen tablet generates and records the stroke data based on the positional coordinates. Therefore, the user can use a pen tablet, conventionally used as a peripheral device of a computer, as a handwritten data recording device like the one described in Japanese Patent No. 6005880 independently and separately from the computer (e.g., as a portable device).

With the pen tablet according to the first aspect of the present invention, it is determined whether or not communication with the device driver executed by the external computer is requested of the communicator. When communication with the device driver is requested, the pen tablet operates in the first mode of supplying the hover coordinates and the contact coordinates to the device driver. When the communication with the device driver is not requested, the pen tablet operates in the second mode of discarding at least part of the hover coordinates and recording stroke data generated based on the contact coordinates in the storage device. Therefore, it becomes possible to avoid exhausting the capacity of the storage device with the hover coordinates when a pen tablet is operated also as a handwritten data recording device for supplying handwritten data to a computer.

With the handwritten data recording device according to the second aspect of the present invention, it becomes possible to record the stroke data while classifying consecutive strokes into subgroups (provisional layers) in a group (page). Therefore, recording of stroke data sets in finer classification than pages becomes possible. For example, on a computer executing a handwritten data drawing method to receive the stroke data, the user may perform various convenient operations such as deleting stroke data included in a given subgroup all at once, generating a layer by merging stroke data sets belonging to two or more subgroups together, and so forth.

With the handwritten data drawing method according to the third aspect of the present invention, the first and second synthetic image data are generated prior to the editing operation on the n-th layer. Therefore, the load on a computer is lightened when processing handwritten data having a layer structure.

With the handwritten data synthesis method according to the fourth aspect of the present invention, it becomes possible to combine handwritten data into one page or layer on the computer's side.

BRIEF DESCRIPTION OF THE DRAWINGS

FIG. 5 is a diagram illustrating a coordinate data set accumulated in a memory illustrated in FIG. 2;

FIG. 8 is a diagram illustrating a coordinate data set accumulated in the memory in a second modification;

DETAILED DESCRIPTION

Embodiments of the present invention will be described in detail below with reference to the accompanying drawings. In the following description, the configuration of each device used in the present invention will be briefly described first and thereafter the configurations characteristic of the present invention will be described in detail.

Figure 1A:
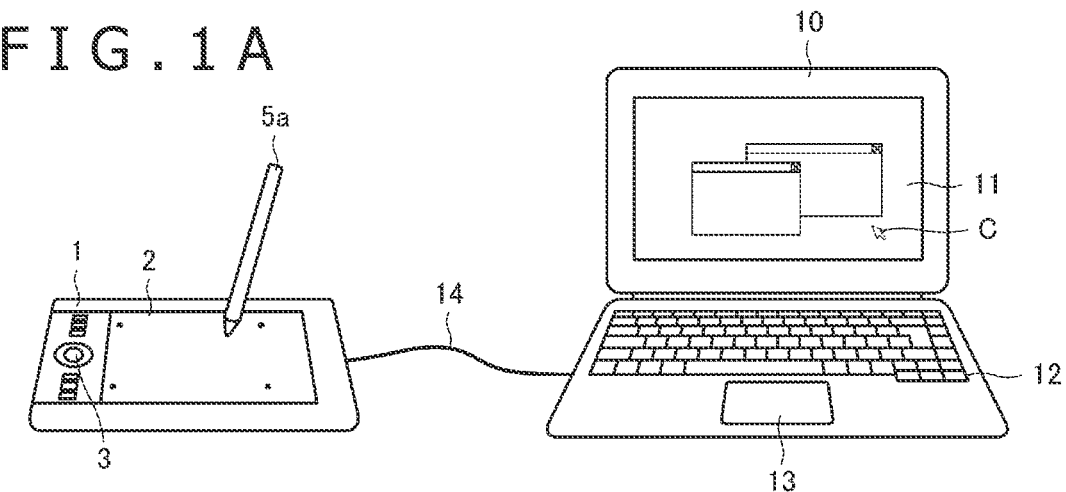
FIG. 1A is a diagram illustrating use of a pen tablet in a table mode according to an embodiment of the present invention.
Figure 1B:
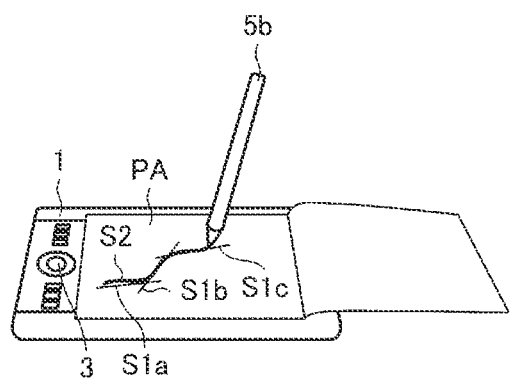
FIG. 1B is a diagram illustrating use of the pen tablet in a paper mode (in independent use) according to an embodiment of the present invention.
Figure 1C:
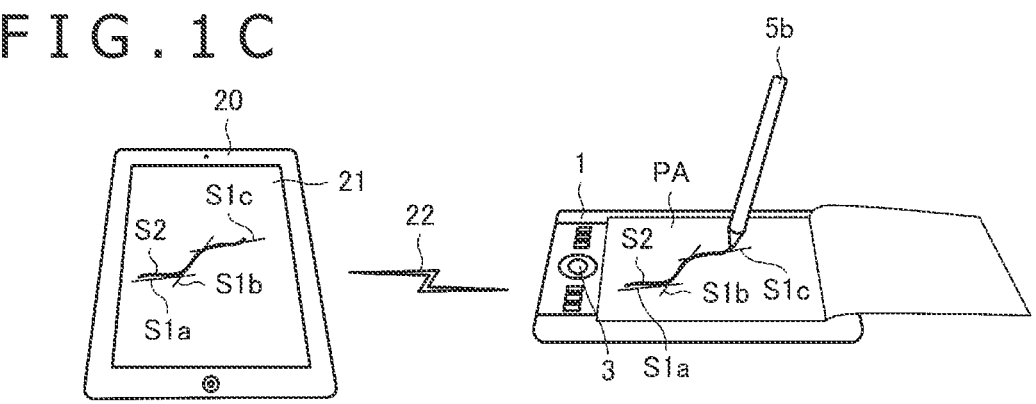
FIG. 1C is a diagram illustrating use of the pen tablet in the paper time (in connection with a computer) according to an embodiment of the present invention.

FIG. 1A is a diagram illustrating use of a pen tablet 1 (handwritten data recording device) in a tablet mode according to an embodiment of the present invention. FIG. 1B is a diagram illustrating use of the pen tablet 1 in a paper mode (in independent use) according to an embodiment of the present invention. FIG. 1C is a diagram illustrating use of the pen tablet 1 in the paper mode (in connection with a computer) according to an embodiment of the present invention. As illustrated in these diagrams, the pen tablet 1 according to the present invention is configured to operate in either of the two modes: the tablet mode (first mode) and the paper mode (second mode). In the paper mode, the operation of the pen tablet 1 used independently is different from the operation of the pen table 1 used in connection with an external computer.

First, the configuration of each device illustrated in FIGS. 1A to 1C will be described briefly. The pen tablet 1 is configured to include a touch sensor 2 and a push button 3. The touch sensor 2 constitutes a touch surface. Each electronic pen 5a or 5b is a pen-type terminal (stylus). The difference between the electronic pens 5a and 5b lies in the presence/absence of the function to write on a paper medium. The electronic pen 5b has an ink effusion function like that of a ballpoint pen, whereas the electronic pen 5a does not have such a function.

The pen tablet 1 is configured to be capable of detecting coordinates representing the position of the electronic pen 5a or 5b on the touch surface by a capacitance method or an electromagnetic induction method. Each electronic pen 5a or 5b is configured to be capable of transmitting various types of data to the pen tablet 1, such as a pen pressure value indicating the force applied to the tip of the electronic pen, side switch information indicating the ON/OFF state of a side switch (not illustrated) provided on the electronic pen, and a stylus identifier (ID) previously stored in the electronic pen. It is also possible to configure the pen tablet 1 and the electronic pen 5a or 5b to be capable of data transmission from the pen tablet 1 to the electronic pen 5a or 5b. In this case, a command for specifying data that should be transmitted from the electronic pen 5a or 5b is transmitted from the pen tablet 1 to the electronic pen 5a or 5b, for example.

Each computer 10 or 20 is a general-purpose computer including a storage device (not illustrated) and a central processing unit (not illustrated) configured to be capable of executing various processes according to a program stored in the storage device. Typically, as illustrated in FIGS. 1A to 1C, the computer 10 is a notebook personal computer including an output device including a display 11 and an input device including a keyboard 12 and a mousepad 13, while the computer 20 is a tablet terminal (electronic equipment) including a touch screen 21. While the following description will be given assuming these typical types of computers, the computers 10 and 20 may also be implemented as other types of computers. Specifically, each computer 10 or 20 can be implemented as any of various types of computers such as a desktop personal computer, a notebook personal computer, a server computer, a tablet terminal, or a smartphone.

The computer 10 is connected to the pen tablet 1 via a USB cable 14 illustrated in FIG. 1A, for example. The computer 20 is connected to the pen tablet 1 via a wireless connection 22 (e.g., wireless connection by Bluetooth®) illustrated in FIG. 1C, for example. However, the connection between the pen tablet 1 and each computer 10 or 20 may also be implemented by a different connection method. For example, the computer 10 and the pen tablet 1 may be connected via a wireless connection such as Bluetooth® or a different type of cable such as a PS/2 cable, and the computer 20 and the pen tablet 1 may be connected via a wired connection by use of a cable such as a USB cable.

Next, the connection and the operation of each (pen tablet) terminal when the pen tablet 1 operates in each mode illustrated in FIGS. 1A to 1C will be described below.

First, the tablet mode illustrated in FIG. 1A is typically a mode for using the electronic pen 5a as a pointing device of the computer 10. The pen tablet 1 in the tablet mode periodically detects the coordinates representing the position of the electronic pen 5a on or over the touch surface and transmits coordinate data including the detected coordinates to the computer 10 via the USB cable 14 upon each detection of the coordinates. The coordinate data transmitted at that time further includes the pen pressure value, the side switch information, etc. received from the electronic pen 5a. Upon each reception of the coordinate data, the computer 10 performs a process of determining the position of a mouse cursor C on the display 11 based on the coordinates included in the received coordinate data and moving the mouse cursor C to the determined position, while also performing a process of receiving a mouse button operation such as clicking, pressing, or dragging based on at least the pen pressure value or the side switch information included in the coordinate data. By the above operation, the use of the electronic pen 5a as the pointing device of the computer 10 is realized.

While the pointing device is taken here as an example of the typical purpose of use of the pen tablet 1 in the tablet mode, the pen tablet 1 in the tablet mode may be used for different purposes. Specifically, the pen tablet 1 in the tablet mode may also be used for inputting a line to drawing software executed by the computer 10, for example.

Next, the paper mode illustrated in FIGS. 1B and 1C is a mode for accumulating a series of coordinate data, representing a line drawn on a paper medium PA by the user of the electronic pen 5b, in the pen tablet 1. When the pen tablet 1 in the paper mode is connected to the computer 20, the pen tablet 1 also performs a process of transmitting a series of coordinate data to the computer 20 in real time.

The paper medium PA is, for example, a longitudinally openable report pad or notepad. The paper medium PA is used in the state of being set on the touch surface of the pen tablet 1 as illustrated in FIGS. 1B and 1C. The pen tablet 1 periodically detects the coordinates representing the position of the electronic pen 5b on or over the paper medium PA, and accumulates coordinate data including the detected coordinates only when the tip of the electronic pen 5b is in contact with the paper medium PA. When the pen tablet 1 is connected to the computer 20, the pen tablet 1 transmits the detected coordinate data to the computer 20 upon each detection. The coordinate data accumulated or transmitted by the pen tablet 1 includes the pen pressure value, the side switch information, etc. received from the electronic pen 5b similarly to the coordinate data transmitted to the computer 10 in the tablet mode.

The pen tablet 1 determines whether the tip of the electronic pen 5b is in contact with the paper medium PA or not by checking the pen pressure value received from the electronic pen 5b. Specifically, the tip of the electronic pen 5b is determined to be not in contact with the paper medium PA if the pen pressure value is zero, or to be in contact with the paper medium PA if the pen pressure value is greater than zero. In the following description, the state of the electronic pen 5b with its pen point not in contact with the paper medium PA will be referred to as a "hover state," while the state of the electronic pen 5b with its pen point in contact with the paper medium PA will be referred to as a "contact state."

The computer 20 receiving a series of coordinate data from the pen tablet 1 in real time performs a process of drawing a line, corresponding to the line drawn on the paper medium PA by the user by using the electronic pen 5b, on the touch screen 21 by performing sequential rendering of the received coordinate data. The rendering includes a process of interpolating a series of coordinates indicated by the series of coordinate data by using an interpolation curve such as a Bezier curve or a Catmull-Rom spline. On the touch screen 21, an interpolation curve obtained by the interpolation process is drawn. This allows the user in the middle of drawing the line on the paper medium PA to check the line also on the touch screen 21.

The computer 20 also performs a process of generating ink data including one or more pieces of stroke data based on a series of coordinate data received from the pen tablet 1 and storing the generated ink data in a storage device, not illustrated. The stroke data is data in units of consecutive contact coordinates (coordinates detected when the electronic pen 5b is in the contact state). More specifically, the stroke data is data including a series of coordinate data detected in a period from a time when the user brings the electronic pen 5b into contact with the paper medium PA to a time when the user detaches the electronic pen 5b from the paper medium PA. In the following description, the operation of bringing the electronic pen 5b into contact with the paper medium PA will be referred to as a pen-down operation, the operation of detaching the electronic pen 5b from the paper medium PA will be referred to as a pen-up operation, and the operation of moving the electronic pen 5b on the paper medium PA between the pen-down operation and the pen-up operation will be referred to as a pen-move operation. When the need for drawing the accumulated ink data on the touch screen 21 arises due to a command from the user, the computer 20 renders the multiple pieces of accumulated stroke data in the order of accumulation. By the above-described operation, it becomes possible to draw the ink data on the touch screen 21 while maintaining the vertical (on top of or underneath, drawn at different times) positional relationship among the multiple pieces of stroke data.

In addition to the aforementioned real-time transmission of a series of coordinate data to the computer 20, the pen tablet 1 is configured to be also capable of transmitting a series of coordinate data stored in its own storage device to the computer 20 in a batch. This type of transmission is carried out when the computer 20 and the pen tablet 1 are newly connected, when an explicit command is issued by the user in the connected state of the computer 20 and the pen tablet 1, and so forth.

The computer 20 receiving a series of coordinate data transmitted in a batch generates the aforementioned ink data based on the received series of coordinate data and stores the generated ink data in the storage device, not illustrated. The drawing of the ink data stored as above is carried out as described earlier.

Figure 2:
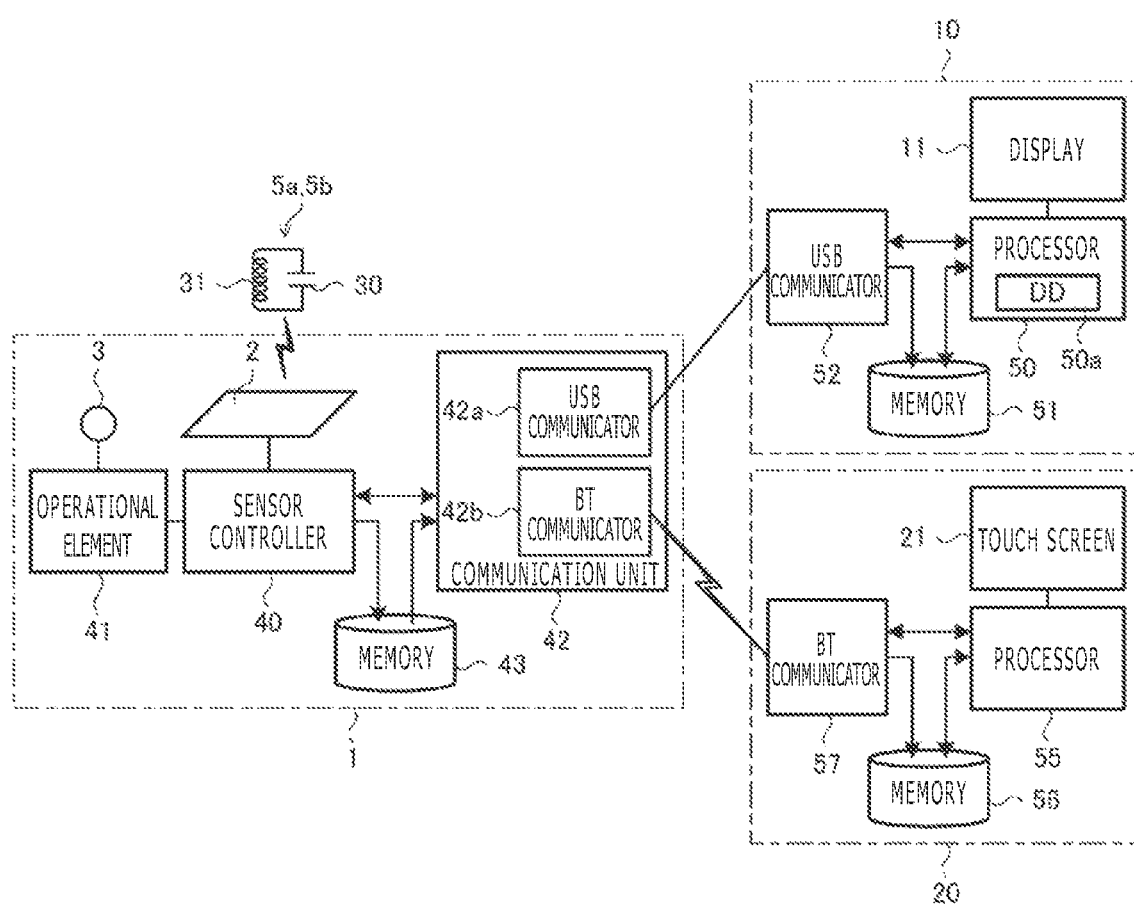
FIG. 2 is a diagram illustrating the internal configuration of the pen tablet, electronic pens, and computers illustrated in FIGS. 1A to 1C.

FIG. 2 is a diagram illustrating the internal configuration of the pen tablet 1, the electronic pens 5a and 5b and the computers 10 and 20. The internal configuration of each of the pen tablet 1, the electronic pens 5a and 5b and the computers 10 and 20 will be described in more detail below with reference to FIG. 2.

First, each electronic pen 5a or 5b is configured to include an LC resonance circuit formed of a capacitor 30 and an inductor 31. The inductor 31 has a function of generating induction voltage according to a magnetic field supplied from the touch sensor 2 of the pen tablet 1 thereby electrically charging the capacitor 30. After the supply of the magnetic field from the touch sensor 2 stops, the inductor 31 transmits reflective signals to the pen tablet 1 by using the voltage accumulated in the capacitor 30. The reflective signals transmitted in such a manner include continuous signals for the position detection, a start signal indicating the end of the continuous signals, and a data signal indicating a portion of the data transmitted from the electronic pen 5a or 5b to the pen tablet 1 (specifically, the side switch information and the stylus ID) in this order.

The capacitor 30 is configured to change its capacitance according to the force (=pen pressure) applied from the writing surface (the touch surface of the pen tablet 1 or the surface of the paper medium PA) to the tip of the electronic pen 5a or 5b. The change in the capacitance of the capacitor 30 causes a change in the resonance frequency of the resonance circuit. Therefore, the frequency of the reflective signal transmitted as above also changes according to the pen pressure. The aforementioned pen pressure value is sent from the electronic pen 5a or 5b to the pen tablet 1 by means of the change in the frequency.

Next, the pen tablet 1 is configured to include a sensor controller 40, an operational element 41, a communicator 42, and a memory 43, as well as the aforementioned touch sensor 2 and push button 3.

Figure 3:
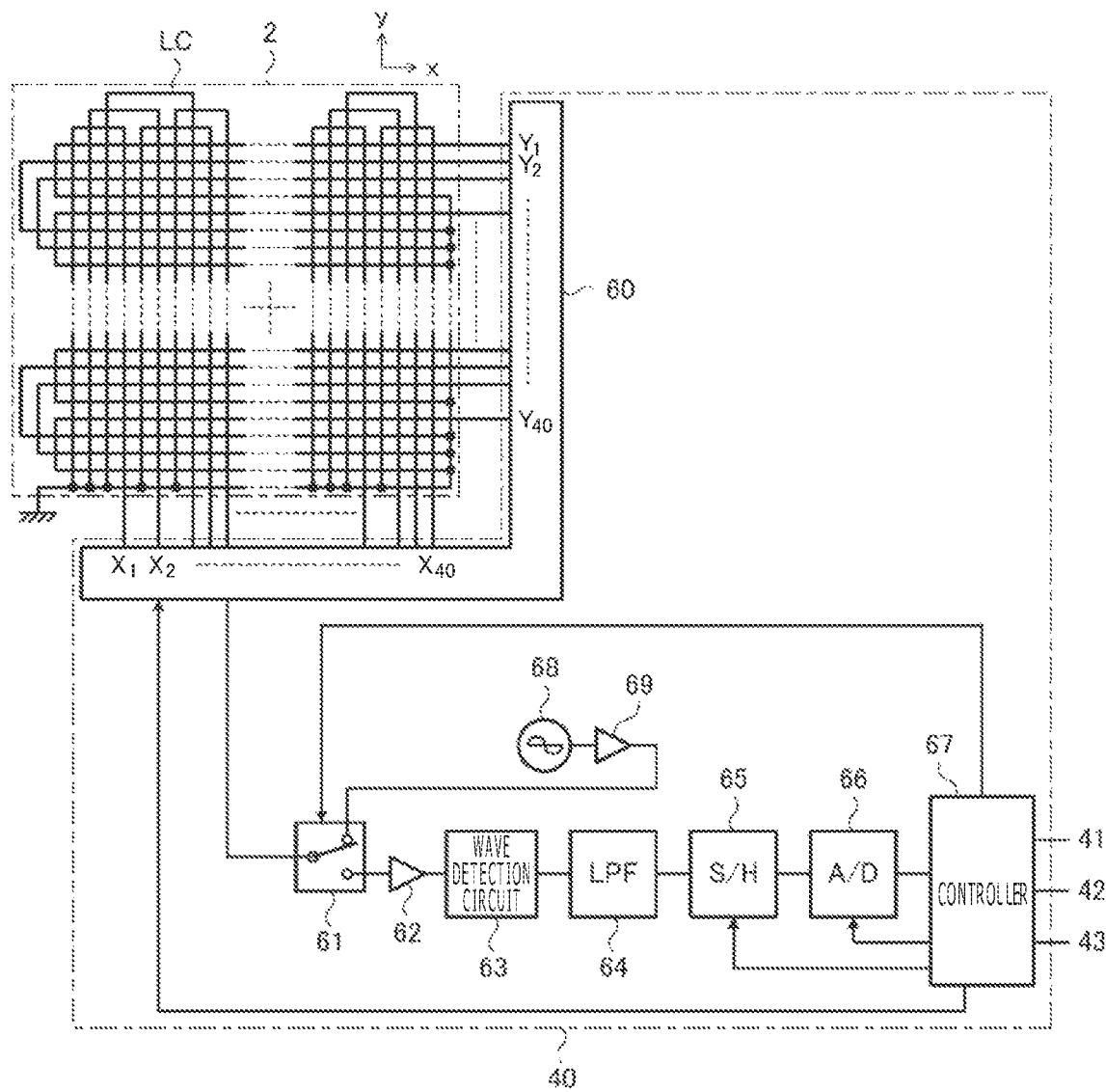
FIG. 3 is a diagram illustrating the internal configuration of a touch sensor and a sensor controller illustrated in FIG. 2.

FIG. 3 is a diagram illustrating the internal configuration of the touch sensor 2 and the sensor controller 40. As illustrated in FIG. 3, the touch sensor 2 is configured by arranging a plurality of loop coils LC in a rectangular planar region. One end of each loop coil LC is grounded, while the other end is connected to the sensor controller 40. Illustrated in FIG. 3 are forty loop coils $X_1$-$X_{40}$ extending in the y direction and forty loop coils $Y_1$-$Y_{40}$ extending in the x direction orthogonal to the y direction as an example of the plurality of loop coils LC. While the following explanation will be given assuming the eighty loop coils $X_1$-$X_{40}$ and $Y_1$-$Y_{40}$ are used, the number of the loop coils LC that should be arranged in the touch sensor 2 is not limited to this example.

As illustrated in FIG. 3, the sensor controller 40 is configured to include a selection circuit 60, a switch circuit 61, an amplifier 62, a wave detection circuit 63, a lowpass filter (LPF) 64, a sample hold circuit (S/H) 65, an analog-to-digital conversion circuit (A/D) 66, a controller 67, an oscillator 68, and a current driver 69.

The aforementioned other end of each loop coil LC is connected to the selection circuit 60. The selection circuit 60 is a circuit for selecting one or more loop coils from the loop coils $X_1$ to $X_{40}$ and $Y_1$ to $Y_{40}$ according to control by the controller 67 and connecting the selected loop coils to the switch circuit 61.

The switch circuit 61 is a switch having one common terminal and two selection terminals. The switch circuit 61 is configured to be capable of switching a selection terminal connected to the common terminal according to control by the controller 67. The common terminal of the switch circuit 61 is connected to the selection circuit 60, one selection terminal is connected to an input end of the amplifier 62, and the other selection terminal is connected to an output end of the current driver 69.

The amplifier 62 is a circuit for amplifying a voltage signal supplied from the selection circuit 60 via the switch circuit 61 and outputting the amplified voltage signal to the wave detection circuit 63. The wave detection circuit 63 is a circuit for performing envelope detection on the voltage signal outputted from the amplifier 62, thereby generating an envelope signal, and outputting the envelope signal to the lowpass filter 64. The lowpass filter 64 has a function of removing high-frequency components from the envelope signal generated by the wave detection circuit 63. The sample hold circuit 65 is configured to perform a sample operation and a hold operation of the envelope signal, from which the high-frequency components have been removed by the lowpass filter 64, at given time intervals. The analog-to-digital conversion circuit 66 generates a digital signal by performing analog-to-digital conversion on the signal held by the sample hold circuit 65 and outputs the digital signal to the controller 67.

The controller 67 is a processor that operates according to a program stored in a storage device, not illustrated. The controller 67 is connected to the operational element 41, the communicator 42, and the memory 43 illustrated in FIG. 2. The controller 67 is configured to perform the following processes in addition to the control of the selection circuit 60, the switch circuit 61, the sample hold circuit 65, and the analog-to-digital conversion circuit 66. Specifically, the processes include a process of identifying and detecting whether the electronic pen 5a or 5b is in the contact state or in the hover state and generating hover coordinates as the positional coordinates of the electronic pen 5a or 5b in the hover state and contact coordinates as the positional coordinates of the electronic pen 5a or 5b in the contact state (detector), a process of acquiring various types of data transmitted from the electronic pen 5a or 5b (the pen pressure value, the side switch information, the stylus ID, etc.), and so forth.

The oscillator 68 is configured to generate an AC signal at a given frequency. The current driver 69 has a function of converting the AC signal outputted from the oscillator 68 into a current signal and supplying the current signal to the switch circuit 61.

The operation of the controller 67 for acquiring the coordinates of the electronic pen 5a or 5b and the various types of data transmitted from the electronic pen 5a or 5b will be concretely described below. First, the controller 67 connects the aforementioned other selection terminal of the switch circuit 61 (the selection terminal connected to the current driver 69) to the common terminal and makes the selection circuit 60 select one of the loop coils $X_1$ to $X_{40}$ and $Y_1$ to $Y_{40}$. Then, a magnetic field is generated by the selected loop coil LC due to the current signal outputted from the current driver 69. While one loop coil LC is selected in this example, the selection circuit 60 may also be configured to select two loop coils LC: one loop coil LC from the loop coils $X_1$ to $X_{40}$ and one loop coil LC from the loop coils $Y_1$ to $Y_{40}$, for example. It is also possible to arrange a special-purpose loop coil, specifically for generating a magnetic field, along the periphery of the touch sensor 2 separately from the loop coils $X_1$ to $X_{40}$ and $Y_1$ to $Y_{40}$ and to select the special-purpose loop coil alone at this stage.

When the electronic pen 5a or 5b enters the magnetic field generated by the loop coil LC, the induction voltage is generated by the inductor 31 (FIG. 2) of the electronic pen 5a or 5b as described above and an electric charge is accumulated in the capacitor 30 (FIG. 2). After the lapse of a defined time period since the connection of the aforementioned other selection terminal of the switch circuit 61 to the common terminal, the controller 67 connects the aforementioned one selection terminal of the switch circuit 61 (the selection terminal connected to the amplifier 62) to the common terminal. Then, the generation of the magnetic field from the loop coil LC ends. In response to the end of the generation of the magnetic field, the electronic pen 5a or 5b starts transmitting the aforementioned reflective signal.

The controller 67 is configured to determine the contents of the reflective signal transmitted from the electronic pen 5a or 5b by decoding the digital signal supplied from the analog-to-digital conversion circuit 66. In the period in which the electronic pen 5a or 5b transmits the continuous signals, the controller 67 scans the voltage generated in each of the loop coils $X_1$ to $X_{40}$ and $Y_1$ to $Y_{40}$ by sequentially switching the loop coil LC selected by the selection circuit 60. The voltage detected in this manner increases with the decrease in the distance between the loop coil LC and the tip of the electronic pen 5a or 5b, and thus the controller 67 is capable of acquiring the coordinates representing the position of the electronic pen 5a or 5b (the aforementioned hover coordinates or the contact coordinates) from the result of the scan.

To shorten the scan time, it is possible to perform the position detection by scanning all loop coils LC only once to perform the initial position detection (in which, the position detection is carried out even in periods in which the electronic pen 5a or 5b transmits the start signal or the data signal, by regarding the start signal or the data signal as the continuous signal) and then to scan only loop coils LC placed in the vicinity of the initially detected position.

In contrast, in the periods in which the electronic pen 5a or 5b transmits the data signal, the controller 67 makes the selection circuit 60 select one loop coil LC according to the detected position of the electronic pen 5a or 5b (normally, the loop coil LC closest to the detected position of the electronic pen 5a or 5b). Then, the side switch information or the stylus ID transmitted from the electronic pen 5a or 5b is acquired from the result of the decoding of the signal obtained via the loop coil LC selected as above.

Further, the controller 67 is configured to detect the frequency of the reflective signal transmitted from the electronic pen 5a or 5b and acquire the pen pressure value transmitted from the electronic pen 5a or 5b from the detected frequency. The controller 67 is configured to identify and detect whether the electronic pen 5a or 5b is in the hover state or in the contact state based on the pen pressure value acquired as above.

Returning to FIG. 2, the push button 3 is a switch of the automatic return type arranged on the front surface of the pen tablet 1. The operational element 41 is configured to be capable of detecting user operations based on the user's manner of depressing the push button 3. The user operations detected by the operational element 41 in this embodiment include at least a first operation and a second operation. The first operation is an operation of depressing the push button 3 just once in a given time (the so-called single click operation), for example. The first operation corresponds to a page break operation (a group update operation) which will be described later. The second operation is an operation of depressing the push button 3 twice in a given time (the so-called double click operation), for example. The second operation corresponds to a layer break operation (a subgroup update operation for updating a subgroup as a subset of a group) which will be described later.

The communicator 42 is a communication interface used for communication with an external computer. Specifically, the communicator 42 is configured to include a USB communicator 42a (first communicator) implementing wired communication by use of a USB cable and a Bluetooth (BT) communicator 42b (second communicator) implementing wireless communication by means of Bluetooth®.

The USB communicator 42a is a functional unit serving as the interface for communication by means of USB. The USB communicator 42a is configured to establish a communication by means of USB with a USB communicator 52 of the computer 10 according to control by the controller 67 (see FIG. 3) of the sensor controller 40. After the communication by means of USB is established, the communication by means of USB is carried out between the controller 67 and a processor 50 of the computer 10 (more specifically, the processor 50 operating according to a device driver (DD) 50a and a given application).

The BT communicator 42b is a functional unit serving as the interface for communication by means of Bluetooth®. The BT communicator 42b is configured to establish a communication by means of Bluetooth® with a BT communicator 57 of the computer 20 according to control by the controller 67 (see FIG. 3) of the sensor controller 40. After the communication by means of Bluetooth® is established, the communication by means of Bluetooth® is carried out between the controller 67 and a processor 55 of the computer 20 (more specifically, the processor 55 operating according to a handwritten data drawing program).

The memory 43 is a storage device that stores, by an appending method, the coordinate data including various types of data acquired by the controller 67 (see FIG. 3) of the sensor controller 40, such as the coordinates and the pen pressure value. The memory 43 is formed of a nonvolatile memory, for example. Upon each acquisition of the coordinates of the electronic pen 5a or 5b, the controller 67 determines whether the acquired coordinates are the hover coordinates or the contact coordinates from the state of the electronic pen 5a or 5b (the hover state or the contact state) detected based on the pen pressure value. When the result of the determination is the contact coordinates, the controller 67 further acquires information indicating the type of movement of the electronic pen 5a or 5b (the pen-down operation, the pen-up operation, or the pen-move operation). Then, the controller 67 generates coordinate data including the acquired information indicating the type of movement of the electronic pen 5a or 5b, the acquired contact coordinates, the newest pen pressure value, the side switch information, etc. and stores the generated coordinate data in the memory 43. The controller 67 generates the stroke data in units of consecutive contact coordinates by successively storing the coordinate data in the memory 43 and recording a series of coordinate data from the pen-down operation to the pen-up operation. The controller 67 also performs a process of associating the stroke data, formed of a series of coordinate data recorded in the memory 43, with a page (group) and a layer (subgroup) based on the type of operation (the first operation or the second operation) detected by the operational element 41. Details of these processes performed by the controller 67 and the memory contents of the memory 43 will be described later.

Next, the computer 10 is configured to include the processor 50, a memory 51, and the USB communicator 52, as well as the aforementioned display 11. The keyboard 12 and the mousepad 13 illustrated in FIG. 1A are not illustrated in FIG. 2.

The processor 50 is configured to be capable of executing programs stored in a storage device, not illustrated. The programs executed by the processor 50 include the device driver 50a providing an interface for the pen tablet 1, as well as the operating system of the computer 10. By executing the device driver 50a, the processor 50 establishes and performs communication by means of USB with the pen tablet 1. When the device driver 50a is described as the subject performing the communication, the communication is performed by the processor 50 operating according to the device driver 50a. Further, upon each reception of the coordinate data from the pen tablet 1, the processor 50 performs a process of determining the position of the mouse cursor C (see FIG. 1A) on the display 11 based on the coordinates included in the received coordinate data and moving the mouse cursor C to the determined position, while also performing a process of receiving a mouse button operation such as clicking, pressing, or dragging based on at least the pen pressure value or the side switch information included in the coordinate data.

The memory 51 is a storage device that stores the coordinate data received from the pen tablet 1. When the pen tablet 1 in the tablet mode is used not as a pointing device but as an input device for drawing software, the processor 50 performs a process of drawing a line, corresponding to a locus of movement of the electronic pen 5a, on the display 11 by performing sequential rendering of the coordinate data received from the pen tablet 1, as well as generating ink data including one or more pieces of stroke data based on a series of coordinate data received from the pen tablet 1 and storing the generated ink data in the memory 51.

The USB communicator 52 is a functional unit serving as the interface for communication by means of USB. The USB communicator 52 is configured to establish a communication by means of USB with the USB communicator 42a of the pen tablet 1 according to control by the processor 50. After the communication by means of USB is established, the communication by means of USB is carried out between the processor 50 (more specifically, the processor 50 operating according to the device driver 50a and a given application) and the controller 67 (see FIG. 3) of the pen tablet 1.

Next, the computer 20 is configured to include the processor 55, a memory 56, and the BT communicator 57 as well as the aforementioned touch screen 21.

The processor 55 is configured to be capable of executing programs stored in a storage device, not illustrated. The programs executed by the processor 55 include, in addition to the operating system of the computer 20, the handwritten data drawing program for performing a drawing process according to the coordinate data successively supplied from the pen tablet 1. By executing the handwritten data drawing program, the processor 55 establishes and performs communication by means of Bluetooth® with the pen tablet 1. The handwritten data drawing program is described as the subject performing the communication, meaning that the communication is performed by the processor 55 operating according to the handwritten data drawing program.

The memory 56 is a storage device that stores the coordinate data received from the pen tablet 1. By operating according to the handwritten data drawing program, the processor 55 performs a process of drawing a line, corresponding to a locus of movement of the electronic pen 5b, on the touch screen 21 by performing sequential rendering of the coordinate data received from the pen tablet 1, as well as generating ink data including one or more pieces of stroke data based on a series of coordinate data received from the pen tablet 1 and storing the generated ink data in the memory 56. The BT communicator 57 is a functional unit serving as the interface for communication by means of Bluetooth®. The BT communicator 57 is configured to establish a communication by means of Bluetooth® with the BT communicator 42b of the pen tablet 1 according to control by the processor 55. After the communication by means of Bluetooth® is established, the communication by means of Bluetooth® is carried out between the processor 55 (more specifically, the processor 55 operating according to the handwritten data drawing program) and the controller 67 (see FIG. 3) of the pen tablet 1.

The configuration of each device used in the present invention has been briefly described above. Next, configurations characteristic of the present invention will be described in detail below. The configurations characteristic of the present invention appear particularly in the processes performed by the controller 67 illustrated in FIG. 3 and the processes performed by the processor 55 illustrated in FIG. 2. Thus, in the following, the former processes will be described in detail first with reference to FIGS. 5 to 9 and thereafter the latter processes will be described in detail with reference to FIGS. 10 to 17. Each electronic pen 5a or 5b can be collectively referred to as a "stylus" in the following description.

Figure 4:
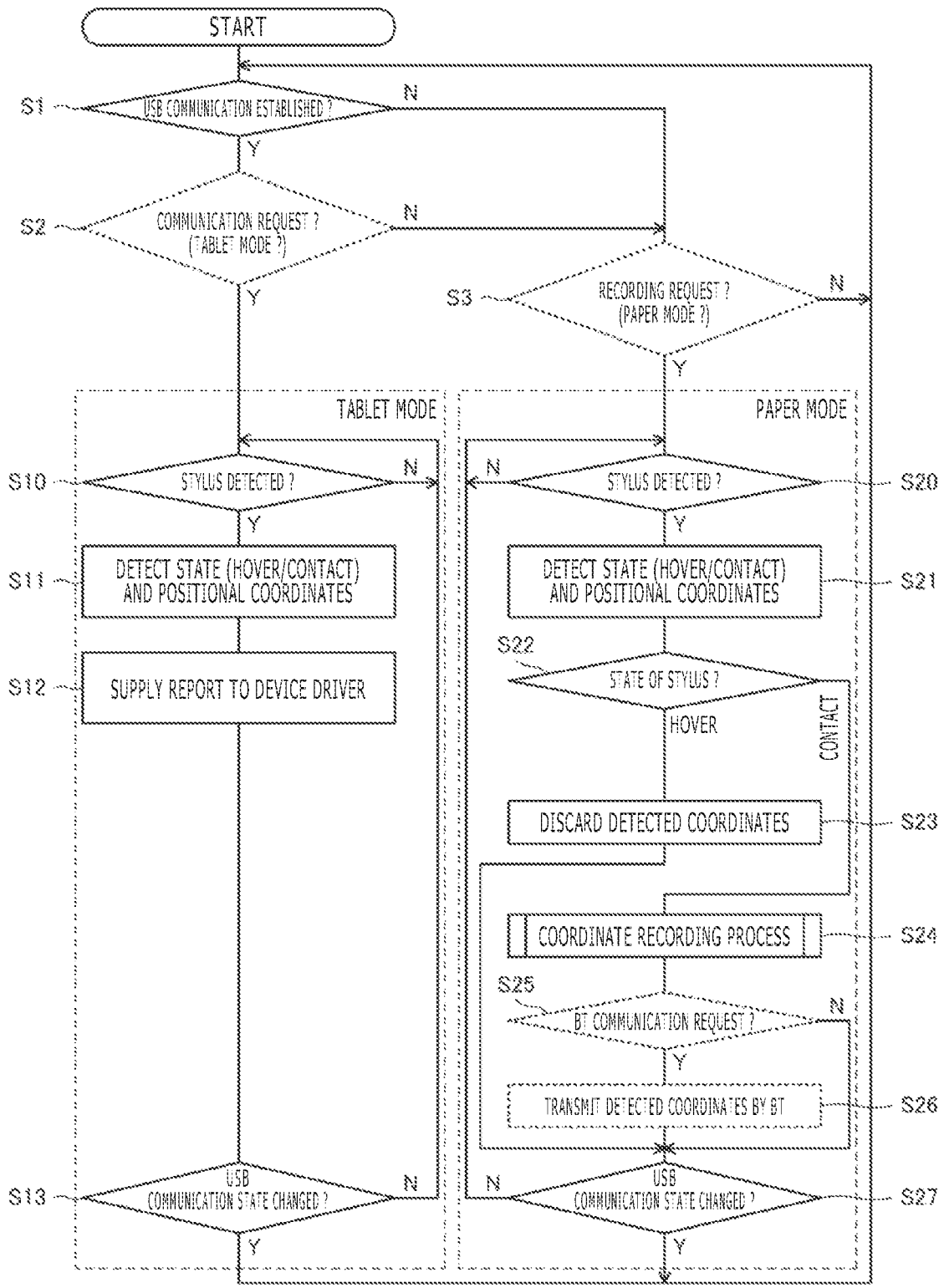
FIG. 4 is a process flow chart illustrating the operation of a controller illustrated in FIG. 3.

FIG. 4 is a process flow chart illustrating the operation of the controller 67 illustrated in FIG. 3. As illustrated in FIG. 4, the controller 67 first determines whether or not USB communication has been established (step S1). In short, this determination is a process of determining whether or not the communicator 42 illustrated in FIG. 2 is requested to perform communication with the device driver 50a executed by the computer 10.

When USB communication is determined to have been established in step S1, the controller 67 determines whether or not there is a coordinate data communication request by means of USB communication (step S2). This communication request is made by the processor 50 (see FIG. 2) operating according to the device driver 50a, for example. When it is determined in step S2 that there is a communication request, the controller 67 enters the tablet mode and starts the operation in the tablet mode (steps S10 to S13). However, the operation in step S2 is optional; the controller 67 may also enter the tablet mode immediately when USB communication is determined to have been established in step S1.

When USB communication is determined not to have been established in step S1, and when it is determined in step S2 that there is no communication request, the controller 67 determines whether or not there is a coordinate data recording request (step S3). This recording request is made by a user operation, for example. When it is determined in step S3 that there is a recording request, the controller 67 enters the paper mode and starts the operation in the paper mode (steps S20 to S27). When it is determined in step S3 that there is no recording request, the controller 67 returns to step S1 and continues the process. However, the operation in step S3 is optional; the controller 67 may also enter the paper mode immediately when USB communication is determined not to have been established in step S1.

The controller 67 entering the tablet mode first waits until a stylus (e.g., the electronic pen 5a illustrated in FIG. 1) is detected (step S10). The controller 67 detects a stylus based on whether or not the aforementioned reflective signal is received by the touch sensor 2.

When a stylus is detected, the controller 67 acquires the state of the stylus (the hover state or the contact state) based on the pen pressure value received from the stylus and detects the coordinates representing the position of the stylus (step S11). Then, the controller 67 transmits a report (coordinate data), including the newest pen pressure value and side switch information received from the stylus and the detected coordinates, to the processor 50 operating according to the device driver 50a (step S12). The coordinates transmitted in this step can be either the hover coordinates or the contact coordinates. The processor 50 receiving the report performs the process of determining the position of the mouse cursor C (see FIG. 1A) on the display 11 based on the coordinates included in the report and moving the mouse cursor C to the determined position, while also performing the process of receiving a mouse button operation such as clicking, pressing, or dragging based on at least the pen pressure value or the side switch information included in the report as described earlier.

The controller 67, after transmitting the report, determines whether or not the state of the USB communication has been changed (step S13). When the state of the USB communication is determined not to have been changed, the controller 67 returns to step S10 and continues the process. Accordingly, the aforementioned report is periodically transmitted from the pen tablet 1 to the computer 10 while the stylus is detected. Conversely, when the state of the USB communication is determined to have been changed, the controller 67 returns to step S1 and continues the process.

Next, the controller 67 entering the paper mode first waits until a stylus (e.g., the electronic pen 5b illustrated in FIG. 1) is detected (step S20). This processing is the same as the processing in step S10.

When a stylus is detected, the controller 67 acquires the state of the stylus (the hover state or the contact state) based on the pen pressure value received from the stylus and detects the coordinates representing the position of the stylus (step S21). Then, the controller 67 determines whether the state of the stylus is the hover state or the contact state (step S22).

When the stylus is determined to be in the hover state in step S22, the controller 67 discards the detected coordinates (step S23). In this case, the controller 67 performs neither the accumulation of the coordinate data in the memory 43 nor the transmission of the coordinate data to the computer 20.

Conversely, when the stylus is determined to be in the contact state in step S22, the controller 67 performs a coordinate recording process for recording the coordinate data in the memory 43 (step S24). Details of the coordinate recording process will be described later with reference to FIGS. 5 and 6.

The controller 67, after performing the coordinate recording process, determines whether or not there is a communication request by means of Bluetooth® (step S25). Specifically, this communication request is made by the processor 55 (see FIG. 2) operating according to the handwritten data drawing program in order to make the pen tablet 1 perform the real-time transmission of the coordinate data. When it is determined in step S25 that there is a communication request, the controller 67 performs a process of transmitting the coordinate data stored in the memory 43 in step S24 to the computer 20 (step S26). The controller 67 determining that there is no communication request does not perform the process of step S26. The operation in steps S25 and S26 is optional; the controller 67 may also be configured not to perform the real-time transmission of the coordinate data irrespective of the presence/absence of the communication request from the processor 55.

When the coordinates are discarded in step S23, and when the transmission of the coordinate data is performed in step S26 (or, when the operation in steps S25 and S26 is not performed, when the coordinate recording process of step S24 is completed), the controller 67 determines whether or not the state of the USB communication has been changed (step S27). When the state of the USB communication is determined not to have been changed, the controller 67 returns to step S20 and continues the process. Accordingly, the coordinate data are periodically recorded in the memory 43 while the stylus is detected. When the operation in steps S25 and S26 is performed, the coordinate data are periodically transmitted from the pen tablet 1 to the computer 20. Conversely, when the state of the USB communication is determined to have been changed, the controller 67 returns to step S1 and continues the process.

FIG. 5 is a diagram illustrating a coordinate data set accumulated in the memory 43 in step S24. Multiple pieces of coordinate data are recorded in the memory 43 in chronological order. As illustrated in FIG. 5, each piece of coordinate data is typically configured to include the information indicating the type of movement of the stylus (the pen-down operation DN, the pen-move operation MV, or the pen-up operation UP), the coordinates X and Y, the pen pressure value PR, first and second side switch information SW1 and SW2, time stamp information T, the page P, and the layer L. Although not illustrated in FIG. 5, the stylus ID, a part of the stylus ID, or a hash value of the stylus ID may also be included in the coordinate data.

As described above, the pen-down operation DN means the operation of bringing the electronic pen 5b into contact with the paper medium PA, the pen-up operation UP means the operation of detaching the electronic pen 5b from the paper medium PA, and the pen-move operation MV means the operation of moving the electronic pen 5b on the paper medium PA between the pen-down operation and the pen-up operation. Thus, a piece of stroke data is formed of a series of coordinate data corresponding to the pen-up operation UP at the beginning, the intermediate pen-move operation MV, and the subsequent pen-up operation UP. FIG. 5 illustrates eight pieces of stroke data ST1 to ST8, as an example.

The coordinates X and Y are the coordinates of the stylus on the touch surface detected by the controller 67. The pen pressure value PR is the pen pressure value transmitted from the stylus to the pen tablet 1. Each of the first and second side switch information SW1 and SW2 is side switch information transmitted from the stylus to the pen tablet 1. The coordinate data is configured to be capable of storing two pieces of side switch information SW1 and SW2 because there are styluses having two side switches. The time stamp information T is information indicating the time when the coordinate data was generated. The coordinate data may also be configured to include an ordinal number indicating the order of generation of a series of coordinate data instead of the time stamp information T.

The page P and the layer L are information respectively indicating a page and a provisional layer to which each piece of stroke data belongs. In the pen tablet 1, in order to realize appropriate management of the stroke data, the stroke data are recorded while classifying consecutive strokes (multiple series of coordinate data) into groups (pages) and subgroups (provisional layers) as subsets of the groups (pages). As a concrete method of classification, each piece of coordinate data is configured to include the page P and the layer L in the example of FIG. 5. The reason why the term "provisional" is used in front of the layer is that each layer recorded in the pen tablet 1 has a high probability of being subsequently corrected in a layer merge process, to be described later, after the stroke data is drawn in the computer 20. There is no difference in the configuration between the layer and the provisional layer.

Figure 6:
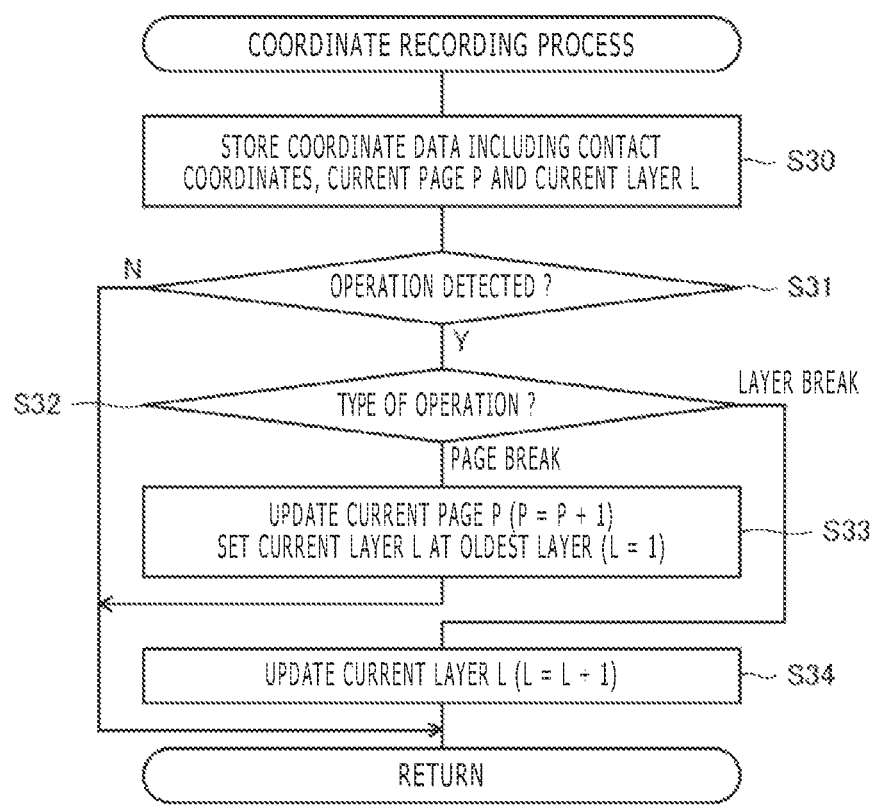
FIG. 6 is a process flow chart illustrating details of a coordinate recording process illustrated in FIG. 4.

FIG. 6 is a process flow chart illustrating details of the coordinate recording process (step S24) illustrated in FIG. 4. In regard to the coordinate recording process, the controller 67 previously stores the page P and the layer L as variables. Initial values of the page P and the layer L are both 1.

As illustrated in FIG. 6, the controller 67 first stores coordinate data, including the contact coordinates detected in step S21 in FIG. 4, the current page P and the current layer L, in the memory 43 (step S30). While the coordinate data also includes other items of information as illustrated in FIG. 5, description of such information is omitted in FIG. 6. By the controller 67 performing step S30 as above, the coordinate data including the contact coordinates are accumulated in the memory 43 in chronological order.

Subsequently, the controller 67 determines whether or not the operational element 41 has detected an operation on the push button 3 (step S31). When the operational element 41 is determined to have detected an operation on the push button 3, the controller 67 further determines whether the type of the detected operation is the first operation (page break operation) or the second operation (layer break operation) (step S32). When the first operation (page break operation) has been detected, the controller 67 updates the page P by incrementing the page P by 1 (P=P+1) and sets the layer L as 1 (oldest layer) (step S33). Conversely, when the second operation (layer break operation) has been detected, the controller 67 updates the layer L by incrementing the layer L by 1 (L=L+1) (step S34). In this case, the page P is not updated.

When the operational element 41 is determined not to have detected an operation on the push button 3 in step S31, and when the process of step S33 or step S34 is completed, the controller 67 ends the coordinate recording process. Subsequent processing is as described in reference to FIG. 4.

By the above-described process, the controller 67 can successively accumulate the coordinate data including the detected contact coordinates in the memory 43 while properly updating the page P and the layer L to be included in the coordinate data according to the user operation.

Here, the configuration of the coordinate data set accumulated in the memory 43 and the coordinate recording process performed by the controller 67 are not limited to the examples described above and various modifications are possible. A first modification of the coordinate recording process and a second modification of the configuration of the coordinate data set will be described below.

Figure 7:
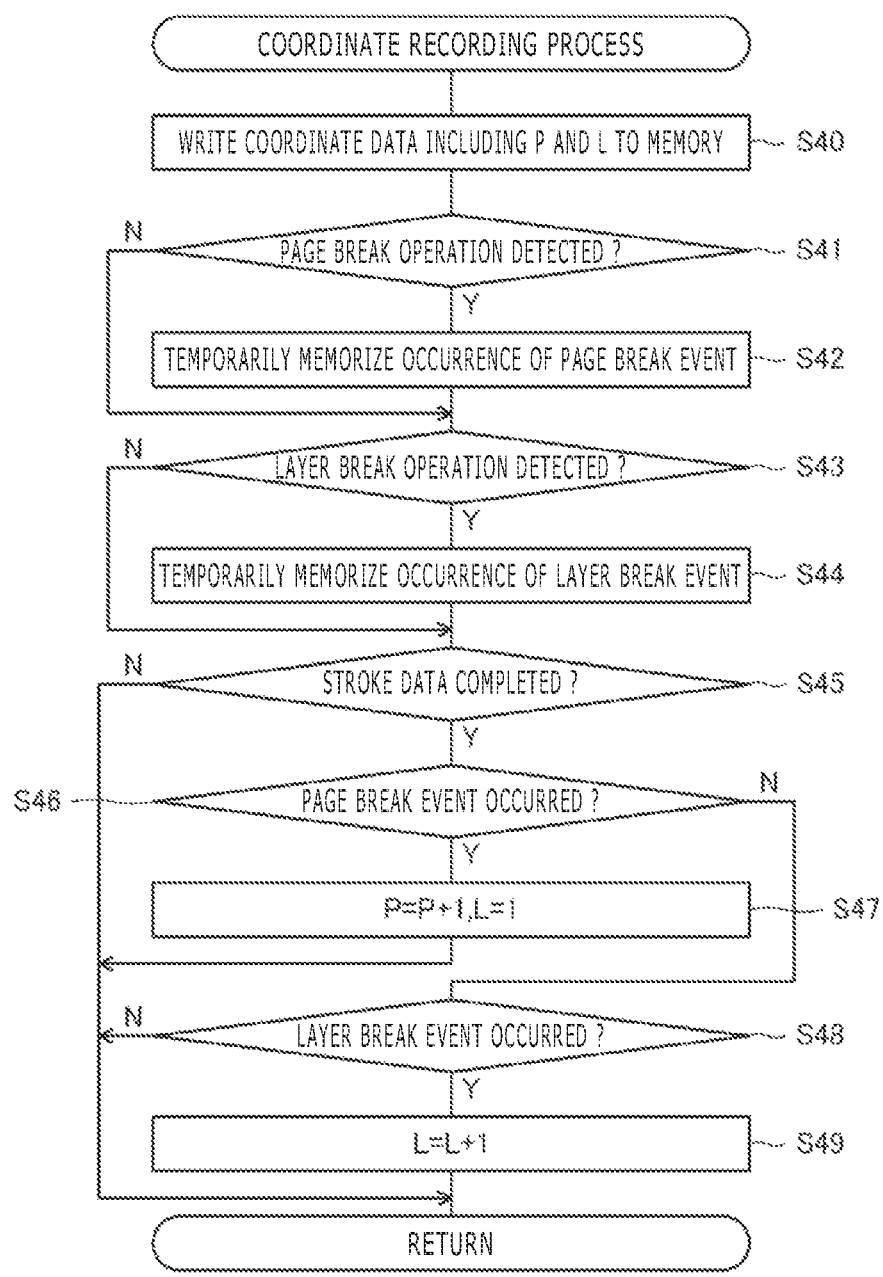
FIG. 7 is a process flow chart illustrating a coordinate recording process according to a first modification.

FIG. 7 is a process flow chart illustrating a coordinate recording process according to the first modification. This modification differs from the example illustrated in FIG. 6 in that even when the page break operation or the layer break operation is performed by the user, the update of the page P or the layer L is suspended while the stroke data is being formed, and the update of the page P or the layer L is performed after the completion of the stroke data. The details will be described below.

The controller 67 first stores coordinate data, including the contact coordinates detected in step S21 in FIG. 4, the current page P and the current layer L, in the memory 43 (step S40). The process of step S40 is substantially identical to the process of step S30 illustrated in FIG. 6. Subsequently, the controller 67 determines whether or not the first operation (page break operation) has been detected by the operational element 41 (step S41), and temporarily memorizes the occurrence of the page break event (step S42) only when the first operation (page break operation) is determined to have been detected. Further, the controller 67 determines whether or not the second operation (layer break operation) has been detected by the operational element 41 (step S43), and temporarily memorizes the occurrence of the layer break event (step S44) only when the second operation (layer break operation) is determined to have been detected.

Subsequently, the controller 67 determines whether or not the stroke data has been completed (step S45). This determination may be made by determining whether or not the coordinate data stored in the memory 43 in step S40 was data including the information representing the pen-up operation UP.

When the stroke data is determined to have been completed in step S45, the controller 67 determines whether or not a page break event occurred during the formation of the stroke data (step S46). The determination is positive when step S42 was executed during the formation of the stroke data, or negative otherwise. The controller 67 determining in step S46 that a page break event occurred updates the page P by incrementing the page P by 1 (P=P+1) and sets the layer L as 1 (step S47).

The controller 67 determining in step S46 that no page break event occurred determines whether or not a layer break event occurred during the formation of the stroke data (step S48). The determination is positive when step S44 was executed during the formation of the stroke data, or negative otherwise. The controller 67 determining in step S48 that a layer break event occurred updates the layer L by incrementing the layer L by 1 (L=L+1) (step S49). In this case, the page P is not updated.

When the stroke data is determined not to have been completed in step S45, and when the process of step S47 or step S49 is completed, the controller 67 ends the coordinate recording process. Subsequent processing is as described in reference to FIG. 4.

According to the process of FIG. 7, assuming that the controller 67 has successively generated first stroke data belonging to a first page (first group) and a first layer (first subgroup) as a subset of the first page, and second stroke data, when neither the first operation nor the second operation was received by the operational element 41 after the start of generating the first stroke data and before the start of generating the second stroke data, the controller 67 associates the second stroke data with the first page and the first layer. When the first operation was received by the operational element 41 after the start of generating the first stroke data and before the start of generating the second stroke data, the controller 67 associates the second stroke data with a second page (second group) different from the first page and a second layer (second subgroup) as a subset of the second page. When the first operation was not received but the second operation was received by the operational element 41 after the start of generating the first stroke data and before the start of generating the second stroke data, the controller 67 associates the second stroke data with the first page and a third layer (third subgroup) which is a subset of the first page and different from the first layer. Here, the second page is a new group different from any group existing before the controller 67 associates the second stroke data with a page (group), the second layer is a new layer different from any layer existing before the controller 67 associates the second stroke data with a layer, and the third layer is a new layer different from any layer existing before the controller 67 associates the second stroke data with a layer. Therefore, it becomes possible to assign an appropriate page P and an appropriate layer L to each of the first and second stroke data according to the user operation.

As described above, according to this modification, the update of the page P and the layer L can be suspended until stroke data is completed. Thus, it becomes possible to prevent the page P and the layer L from being updated in the middle of stroke data.

Figure 8:
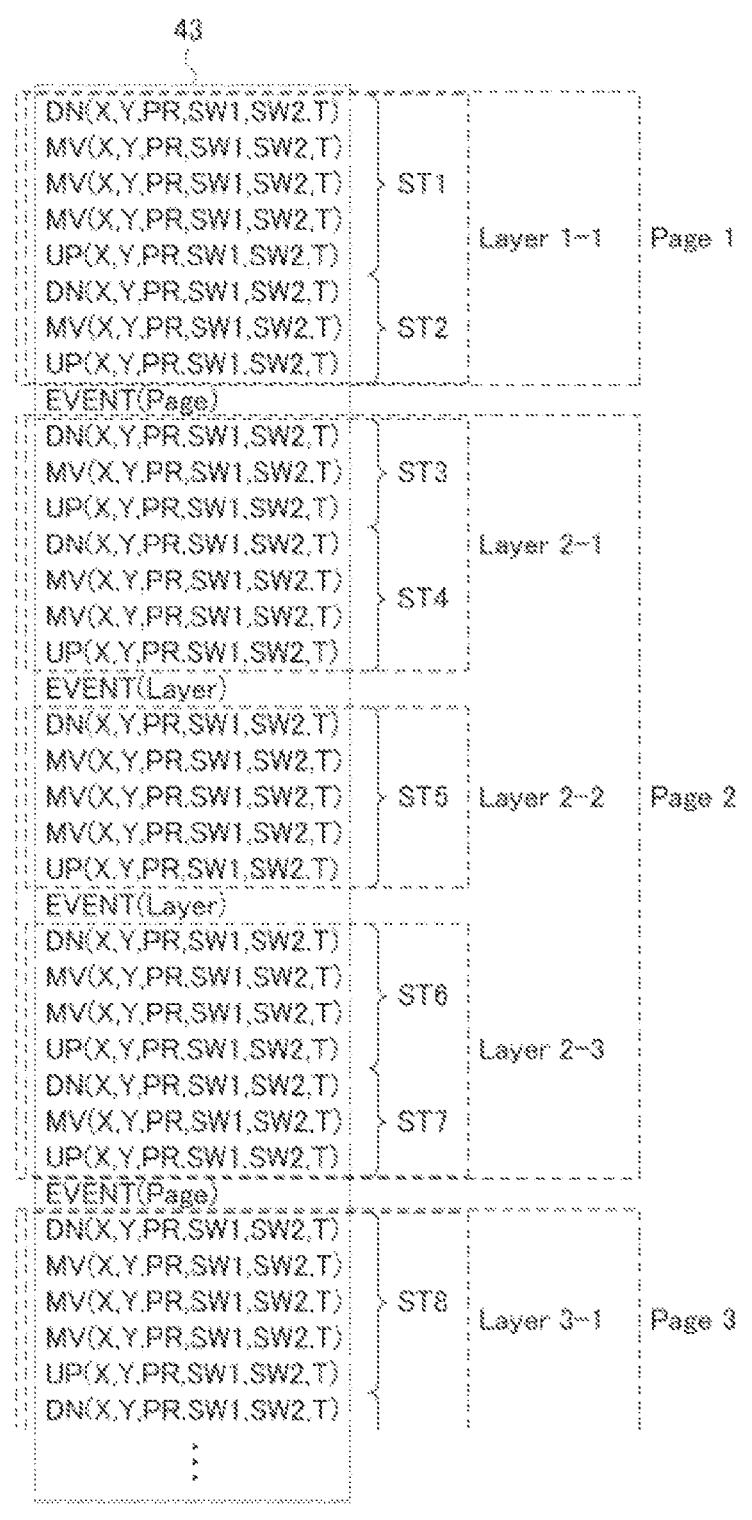
Figure 9:
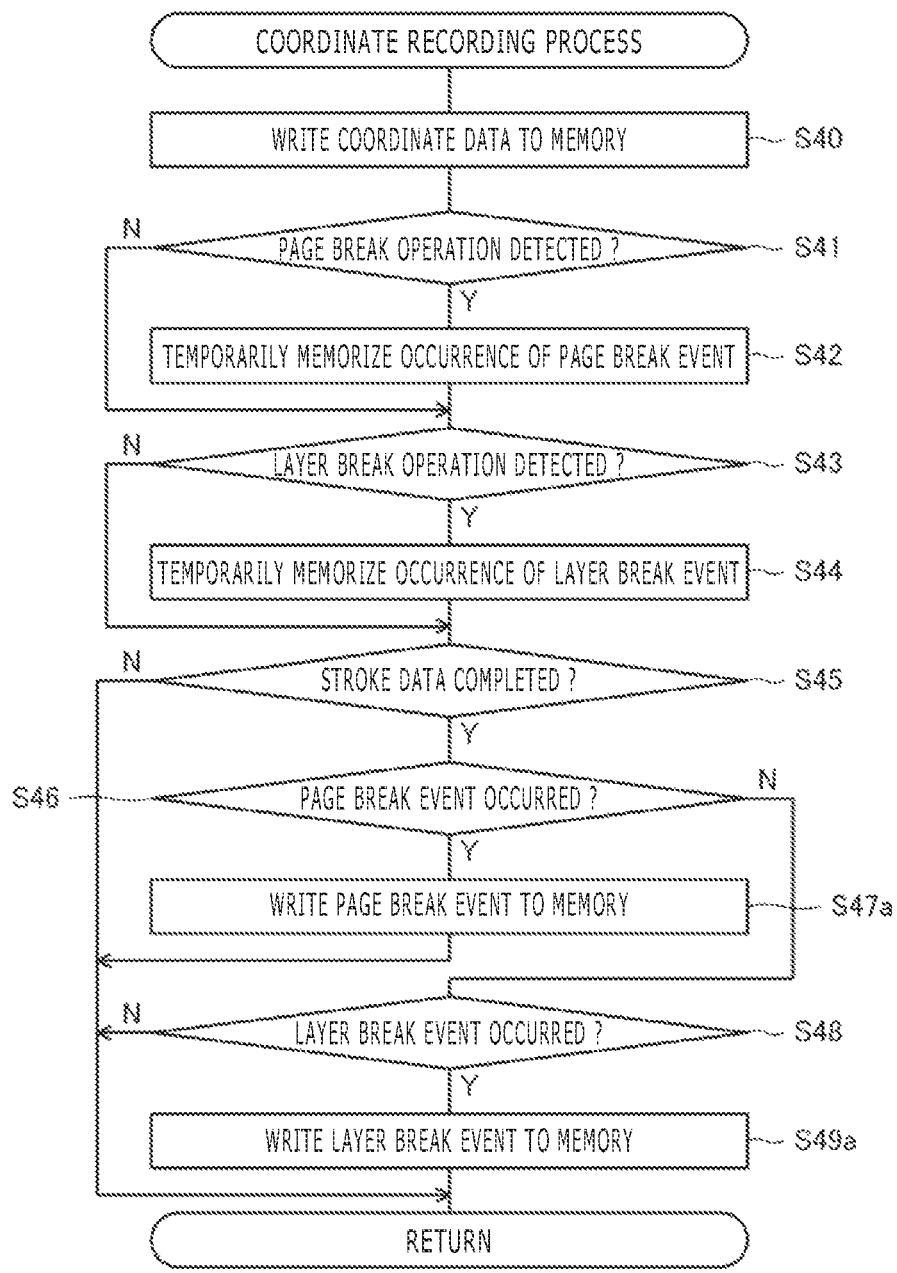
FIG. 9 is a process flow chart illustrating a coordinate recording process according the second modification.

Next, FIG. 8 is a diagram illustrating a coordinate data set accumulated in the memory 43 in the second modification. FIG. 9 is a process flow chart illustrating a coordinate recording process according to the second modification. This modification differs from the example illustrated in FIG. 5 in the data structure of the coordinate data set in the memory 43. The coordinate recording process illustrated in FIG. 9 is basically similar to the coordinate recording process illustrated in FIG. 7 but has some different features due to the difference in the data structure of the coordinate data set in the memory 43. The following description will be given mainly of the difference.

As illustrated in FIG. 8, the coordinate data according to this modification does not include the page P or the layer L. Instead, events "EVENT(Page)" representing delimiters between pages and events "EVENT(Layer)" representing delimiters between layers are arranged in the coordinate data set in chronological order, by which page delimiters and layer delimiters are indicated.

As illustrated in FIG. 9, from step S40 to step S46, the controller 67 according to this modification performs the same processing as in FIG. 7. When a page break event is determined to have occurred in step S46, the controller 67 writes the page break event "EVENT(Page)" to the memory 43 (step S47a). Conversely, the controller 67 determining in step S46 that no page break event has occurred determines whether or not a layer break event occurred during the formation of the stroke data (step S48) similarly to the example of FIG. 7. In the case where a layer break event is determined to have occurred in step S48, the controller 67 writes the layer break event "EVENT(Layer)" to the memory 43 (step S49a).

When the stroke data is determined not to have been completed in step S45, and when the process of step S47a or step S49a is completed, the controller 67 ends the coordinate recording process. Subsequent processing is as described in reference to FIG. 4. According to the process of FIG. 9, when the first operation was received by the operational element 41 after the start of generating the first stroke data and before the start of generating the second stroke data, the controller 67 records a first event (page break event "EVENT(Page)") corresponding to the first operation in the memory 43 between a series of contact coordinates corresponding to the first stroke data and a series of contact coordinates corresponding to the second stroke data. Accordingly, the second stroke data is associated with a page and a layer different from those of the first stroke data.

When the first operation was not received but the second operation was received by the operational element 41 after the start of generating the first stroke data and before the start of generating the second stroke data, the controller 67 records a second event (layer break event "EVENT(Layer)") corresponding to the second operation in the memory 43 between a series of contact coordinates corresponding to the first stroke data and a series of contact coordinates corresponding to the second stroke data. Accordingly, the second stroke data is associated with a different layer in the same page as the first stroke data.

As described above, according to this modification, it becomes possible to embed events "EVENT(Page)" and "EVENT(Layer)" in the coordinate data set. Since the places of page break and layer break are recorded, this modification also enables the computer 20 to acquire the page and the layer. Further, according to this modification, each piece of coordinate data does not need to include the page P and the layer L, which makes it possible to reduce the data volume of the coordinate data.

The processes performed by the controller 67 illustrated in FIG. 3 have been described in detail above along with the explanation of the first and second modifications. Next, the processes performed by the processor 55 (see FIG. 2) of the computer 20 will be described in detail below with reference to FIGS. 10 to 17.

Figure 10:
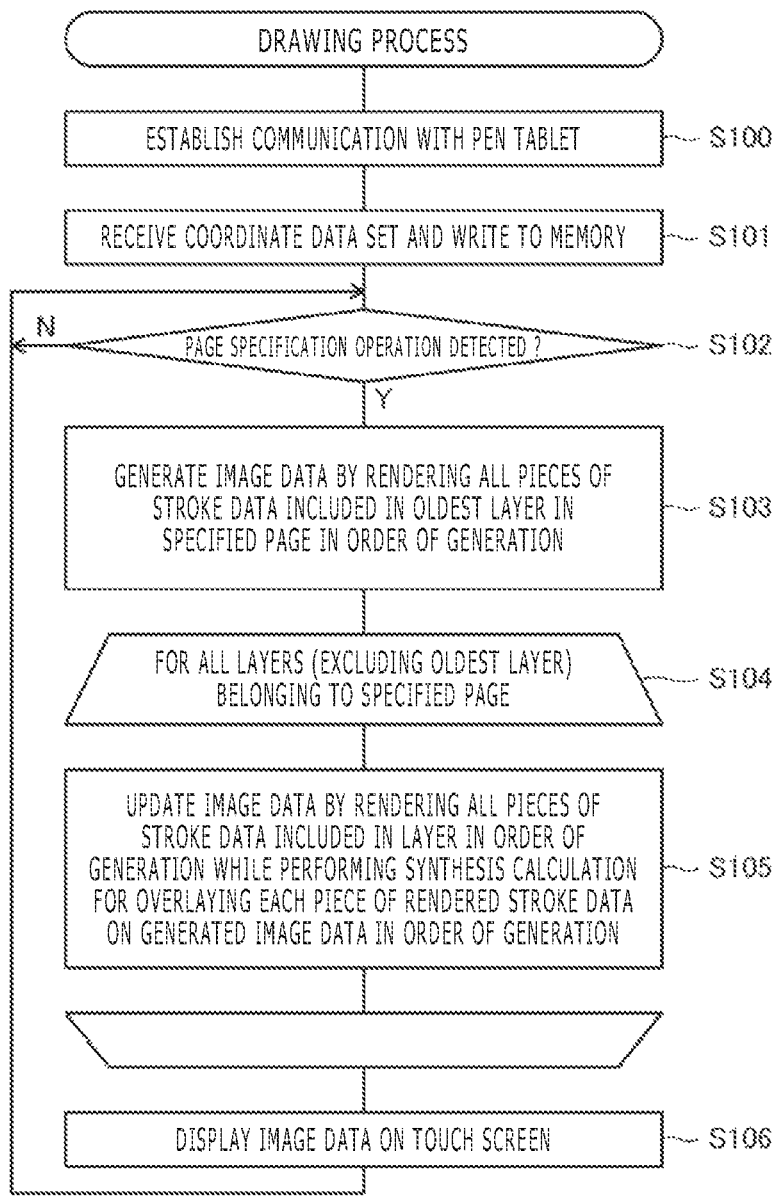
FIG. 10 is a process flow chart illustrating a drawing process performed by a processor illustrated in FIG. 2.

First, FIG. 10 is a process flow chart illustrating the drawing process performed by the processor 55. This process flow indicates a basic drawing process performed by the computer 20 receiving a coordinate data set from the pen tablet 1.

As illustrated in FIG. 10, the processor 55 first establishes communication with the pen tablet 1. This communication is communication by means of Bluetooth®, for example, as described above. Then, the processor 55 receives a coordinate data set from the pen tablet 1 via the established communication and writes the received coordinate data set to the memory 56 (step S101). The data structure of the coordinate data set in the memory 56 may either be the same as or different from that illustrated in FIG. 5 or FIG. 8.

Subsequently, the processor 55 waits for the occurrence of a page specification operation by the user (step S102). The page specification operation is an operation performed by the user by tapping on a page specification icon (not illustrated) displayed on the touch screen 21, for example. Upon the occurrence of the page specification operation, the processor 55 first generates image data by rendering all pieces of stroke data included in the oldest layer in the specified page in the order of generation (step S103). In this rendering, an interpolation process by using an interpolation curve such as a Bezier curve or a Catmull-Rom spline is carried out as described above. Further, when the coordinate data includes the pen pressure value PR, a process of changing the line width according to the pen pressure value PR is carried out. Furthermore, when the coordinate data includes the stylus ID, a process of changing the line color according to the stylus ID may also be carried out.

After completing step S103, the processor 55 performs the process of step S105 for all layers (excluding the oldest layer) in the specified page (step S104). For example, when the specified page is the page 2 illustrated in FIG. 8, the processor 55 first generates image data by rendering all pieces of stroke data included in the layer 2-1 (stroke data ST3 and ST4) in the order of generation, and thereafter performs the process of step S105 for each of the other layers 2-2 and 2-3. The process of step S105 is performed in the order of generation of the layers.

In step S105, the processor 55 updates the image data by rendering all pieces of stroke data included in the layer in the order of generation while performing a synthesis calculation for successively overlaying each piece of rendered stroke data on generated image data (image data generated in step S103, or image data updated in the previously performed step S105 in cases of the second or subsequent step S105) in the order of generation.

After the repetitive processing of step S104 is completed, the processor 55 displays the finally obtained image data on the touch screen 21 (step S106). This allows the user to check the contents of the specified page, specified by performing the page specification operation, on the touch screen 21.

Figure 11:
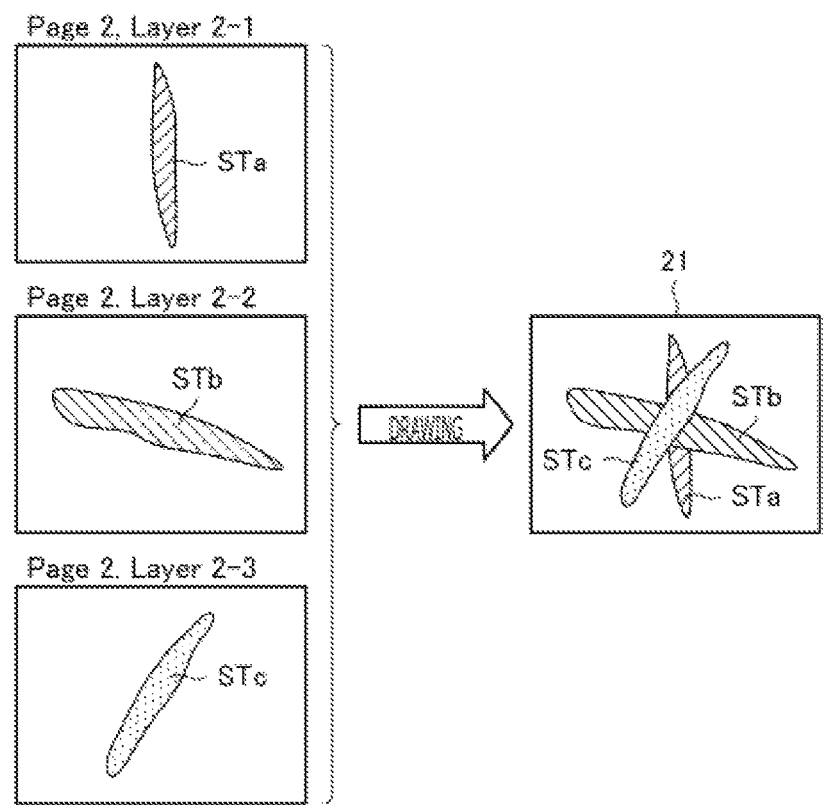
FIG. 11 is an explanatory drawing of a process in step S105 of FIG. 10.

FIG. 11 is an explanatory drawing of the process in step S105. In the example illustrated in FIG. 11, page 2 includes three provisional layers 2-1 to 2-3. While the number of provisional layers in one page is assumed to be three in this example for the simplicity of the explanation, one page generally includes a greater number of (e.g., 1000 or more) provisional layers in reality. Further, while each provisional layer 2-1, 2-2, or 2-3 is illustrated to include one piece of stroke data STa, STb, and STc in this example, each provisional layer can actually include two or more pieces of stroke data.

The provisional layers 2-1 to 2-3 are generated in this order. The processor 55 first generates image data by rendering the stroke data STa of the oldest provisional layer 2-1. Subsequently, the processor 55 renders the stroke data STb of the second oldest provisional layer 2-2 and overlays the rendered stroke data STb on the image data. Finally, the processor 55 renders the stroke data STc of the newest provisional layer 2-3 and overlays the rendered stroke data STc on the image data. Accordingly, as illustrated in the right-hand part of FIG. 11, all of the three pieces of stroke data STa to STc included in the page 2 are superimposed together and displayed in the same pixel region, and further, the stroke data STa to STc are drawn in such a way that the stroke data STb is placed over the stroke data STa and the stroke data STc is placed over the stroke data STb.

While stroke data placed relatively below (e.g., the stroke data STb) is hidden by stroke data placed relatively above (e.g., the stroke data STc) in FIG. 11, it is also possible to assign a degree of transparency to each piece of stroke data and carry out the synthesis so that the stroke data placed relatively below can be seen through the stroke data placed relatively above. The synthesis calculation in this case is suitably performed by using the publicly known alpha blending technology.

Returning to FIG. 10, the processor 55 completing the process of step S106 returns to step S102 and waits for the occurrence of the user's page specification operation again. Accordingly, each time the user performs the page specification operation, all the layers included in the specified page are newly drawn on the touch screen 21.

Figure 12:
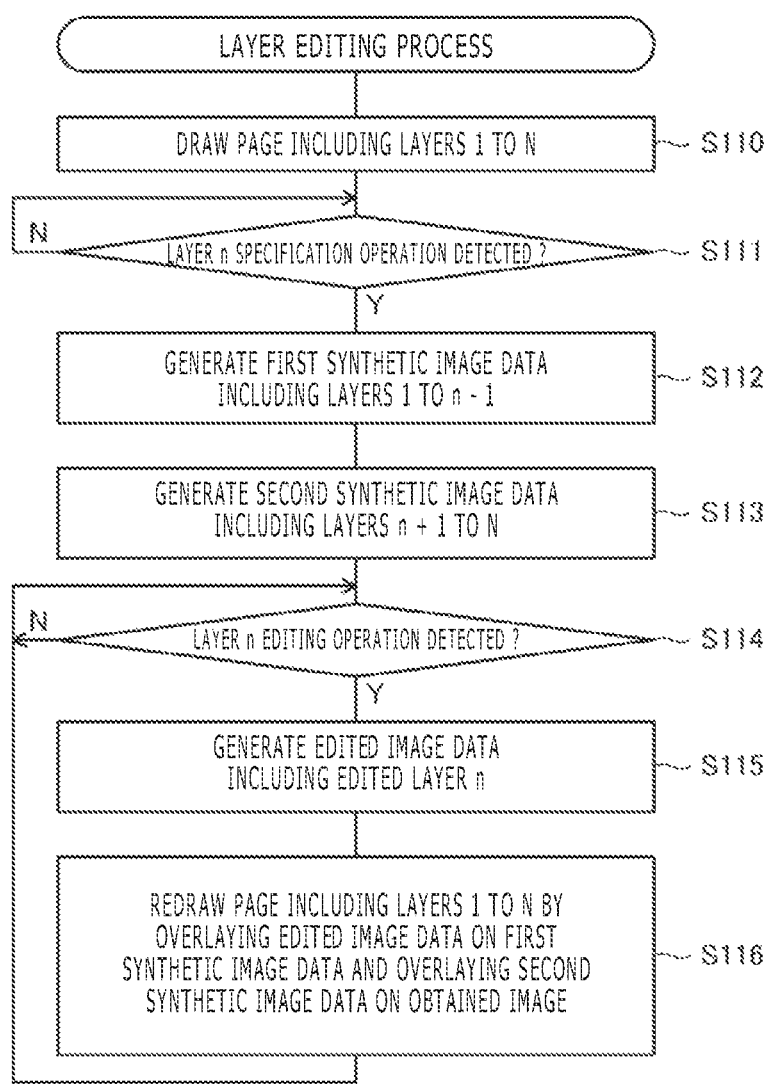
FIG. 12 is a process flow chart illustrating a layer editing process performed by the processor illustrated in FIG. 2.

Next, FIG. 12 is a process flow chart illustrating a layer editing process performed by the processor 55. The processor 55 has a function of receiving the user's editing in regard to the layers drawn by the process of FIG. 11. In this case, conventional technology needs to perform a synthesis calculation of all layers upon each editing operation, and the processing load on the computer 20 becomes excessive due to the calculation process when the number of layers or the number of pieces of stroke data included in each layer is large. The layer editing process illustrated in FIG. 12 makes it possible to prevent such an increase in the processing load. The details will be described below.

First, the processor 55 draws a page including N layers 1 to N (step S110). This drawing process is performed in step S105 in FIG. 10. In a state in which the process of step S110 has been completed and the page is displayed on the touch screen 21, the processor 55 waits for the occurrence of a layer n specification operation (1≤n≤N) by the user (step S111). This specification operation is an operation performed by the user by tapping on a layer specification icon (not illustrated) displayed on the touch screen 21, for example.

Upon the occurrence of layer n specification operation, the processor 55 generates first synthetic image data by rendering stroke data sets included in the layers 1 to n−1 (step S112: first aggregation step). More specifically, the processor 55 generates the first synthetic image data by rendering a set of stroke data included in each of all layers respectively generated before layer n in time in the order of generation of the stroke data. Further, the processor 55 generates second synthetic image data by rendering stroke data sets included in the layers n+1 to N (step S113: second aggregation step). More specifically, the processor 55 generates the second synthetic image data by rendering a set of stroke data included in each of all layers respectively generated after layer n in time in the order of generation of the stroke data.

Subsequently, the processor 55 waits for the occurrence of a specific editing operation on layer n (step S114). The editing operation detected here includes deletion of stroke data in the stroke data set included in layer n or addition of new stroke data to layer n. Upon each occurrence of the editing operation, the processor 55 performs re-rendering of the layers 1 to N (rendering step). Specifically, the processor 55 generates edited image data by performing the detected editing operation on the stroke data set belonging to layer n after the editing (step S115). Further, the processor 55 redraws the page including the layers 1 to N by overlaying the edited image data on the first synthetic image data and overlaying the second synthetic image data on the image obtained as a result of said overlaying (step S116).

Figure 13:
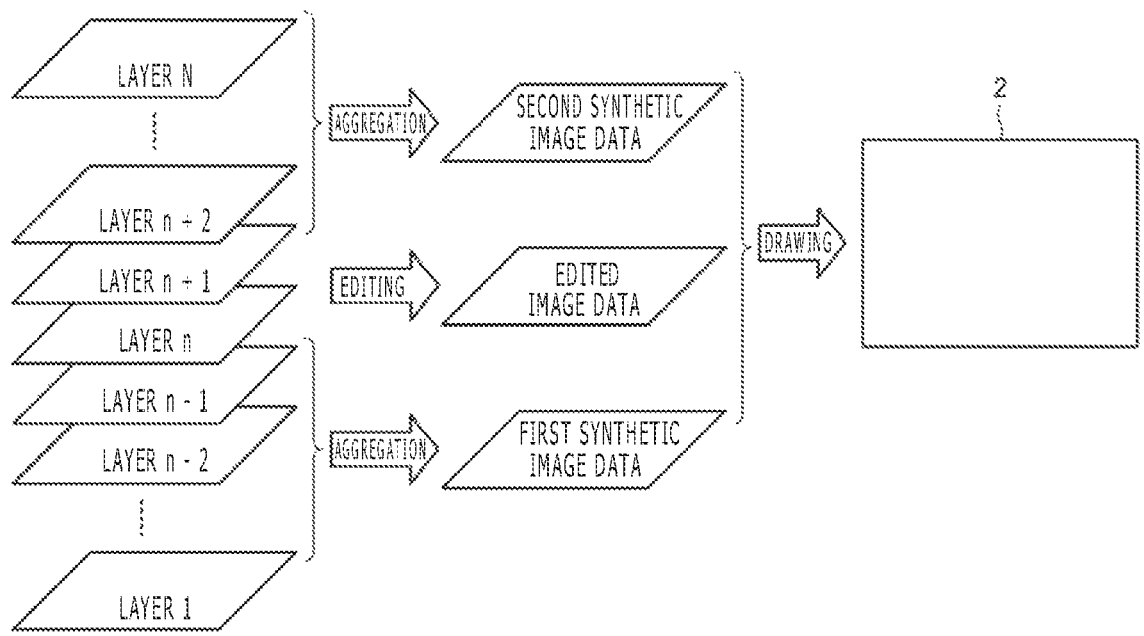
FIG. 13 is an explanatory drawing of the layer editing process illustrated in FIG. 12.

FIG. 13 is an explanatory drawing of the layer editing process illustrated in FIG. 12. On the left-hand side of FIG. 13, N layers 1 to N included in one page are illustrated. When the editing of layer n is performed by the user, the processor 55 previously generates the first synthetic image data by aggregating the layers 1 to n−1 placed below layer n, while also previously generating the second synthetic image data by aggregating the layers n+1 to N placed above layer n. Accordingly, in the redrawing which occurs each time the editing of layer n is performed, it is sufficient to perform synthesis calculation of only three images: the first synthetic image data, the edited image data obtained by editing layer n, and the second synthetic image data. Therefore, the processing load on the computer 20 is lightened significantly compared to the case where the synthesis calculation of N layers is performed each time.

Figure 14:
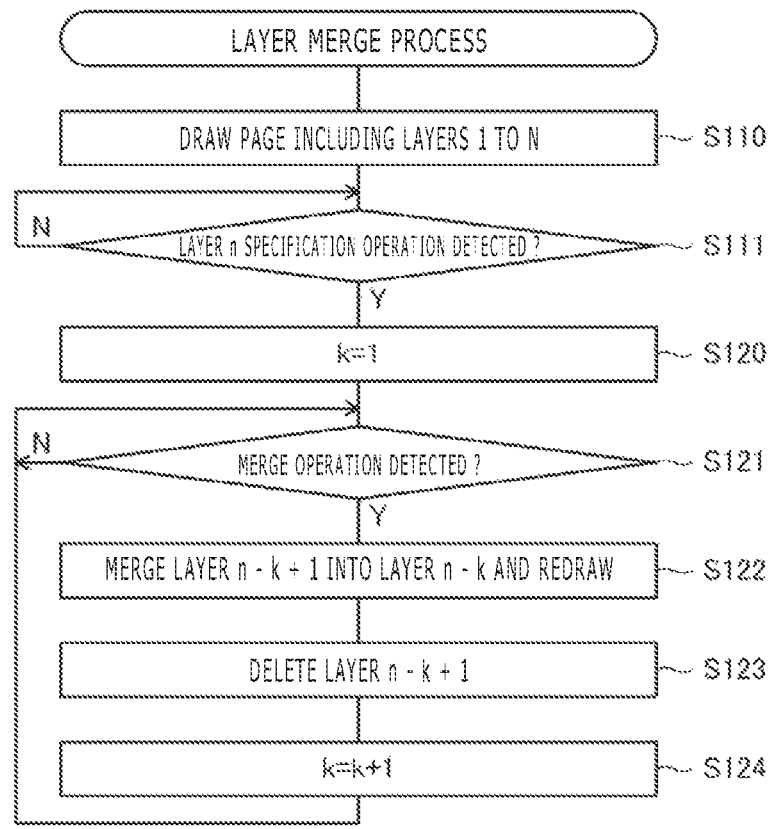
FIG. 14 is a process flow chart illustrating a layer merge process performed by the processor illustrated in FIG. 2.

Next, FIG. 14 is a process flow chart illustrating a layer merge process performed by the processor 55. Conventionally, it is impossible to combine a plurality of provisional layers formed by operating the push button 3 (see FIG. 1) into one layer. Especially when the pen tablet 1 is used independently as illustrated in FIG. 1B, the user cannot press the push button 3 while checking the configuration of the provisional layers. Consequently, there are cases where a delimiter for separating provisional layers is inserted at an inappropriate position. By the layer merge process illustrated in FIG. 14, even when the provisional layer delimiter has been inserted into an inappropriate position, the delimiter can be deleted (i.e., provisional layers can be combined together) afterwards by an easy method. The details will be described below.

First, the processor 55 performs steps S110 and S111 described in reference to FIG. 12. The processor 55 detecting layer n specification operation in step S111 substitutes 1 into a variable k (step S120) and waits for the occurrence of a merge operation (step S121). The merge operation is performed by the user by tapping on a merge operation icon (not illustrated) displayed on the touch screen 21, for example.

Upon the occurrence of the merge operation, the processor 55 merges layer n−k+1 into layer n−k and performs the redrawing (step S122: layer synthesis step). Specifically, the merge process performed here is a process of associating the stroke data set included in layer n−k and the stroke data set included in layer n−k+1, with layer n−k, while maintaining the ordinal relationship. After performing step S122, the processor 55 deletes layer n−k+1 (step S123), increments variable k by 1 (step S124), and returns to step S121.

Figure 15:
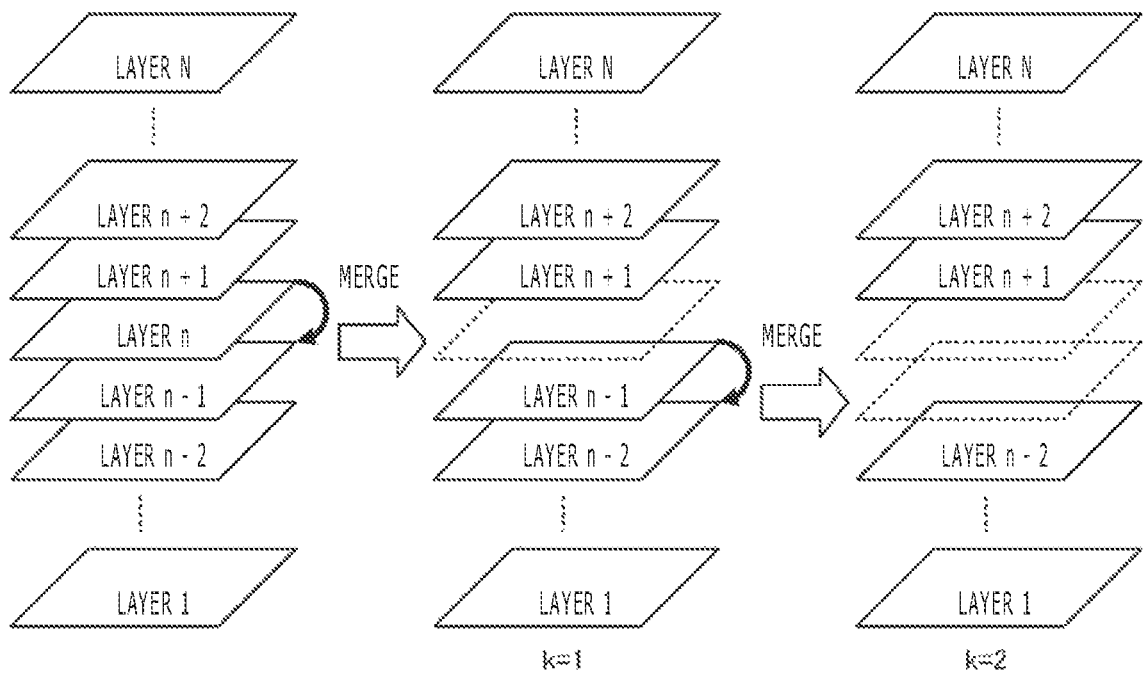
FIG. 15 is an explanatory drawing of the layer merge process illustrated in FIG. 14.

FIG. 15 is an explanatory drawing of the layer merge process illustrated in FIG. 14. On the left-hand side of FIG. 15, N layers 1 to N included in one page are illustrated. When the user performs the merge operation while specifying layer n, the processor 55 performs steps S122 and S123 illustrated in FIG. 14 under the condition that variable k equals 1. Accordingly, layer n is merged into layer n−1 and then layer n is deleted. Subsequently, when the user performs the merge operation again, the processor 55 performs steps S122 and S123 illustrated in FIG. 14 under the condition that variable k equals 2. Accordingly, layer n−1 is merged into layer n−2 and then layer n−1 is deleted. As above, in the second and subsequent merge operations, the user can successively combine layers one by one downward by just performing the merge operation without the need for specifying a layer. Thus, it becomes possible to successively combine layers afterwards by an easy method.

While an example of successively combining layers one by one downward has been described in reference to FIGS. 14 and 15, a different combining method can also be employed. Thus, a third modification of the layer merge process will be described below.

Figure 16:
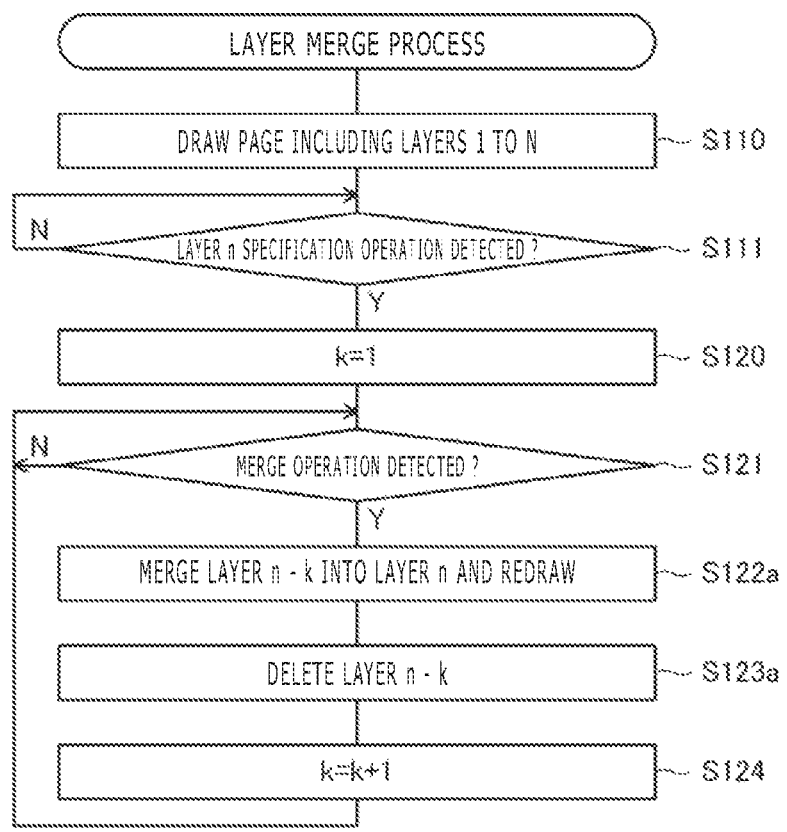
FIG. 16 is a process flow chart illustrating a layer merge process according to a third modification.

FIG. 16 is a process flow chart illustrating a layer merge process according to the third modification. This modification differs from the example illustrated in FIG. 14 in that steps S122 and S123 are replaced with steps S122a and S123a. The details will be described below focusing on the difference.

After detecting the merge operation in step S121, the processor 55 according to this modification merges layer n−k into layer n and performs the redrawing (step S122a: layer synthesis step). Specifically, the merge process performed here is a process of associating the stroke data set included in layer n and the stroke data set included in layer n−k, with layer n, while maintaining the ordinal relationship. After performing step S122a, the processor 55 deletes layer n−k (step S123a). Subsequent processing is as described in reference to FIG. 14.

Figure 17:
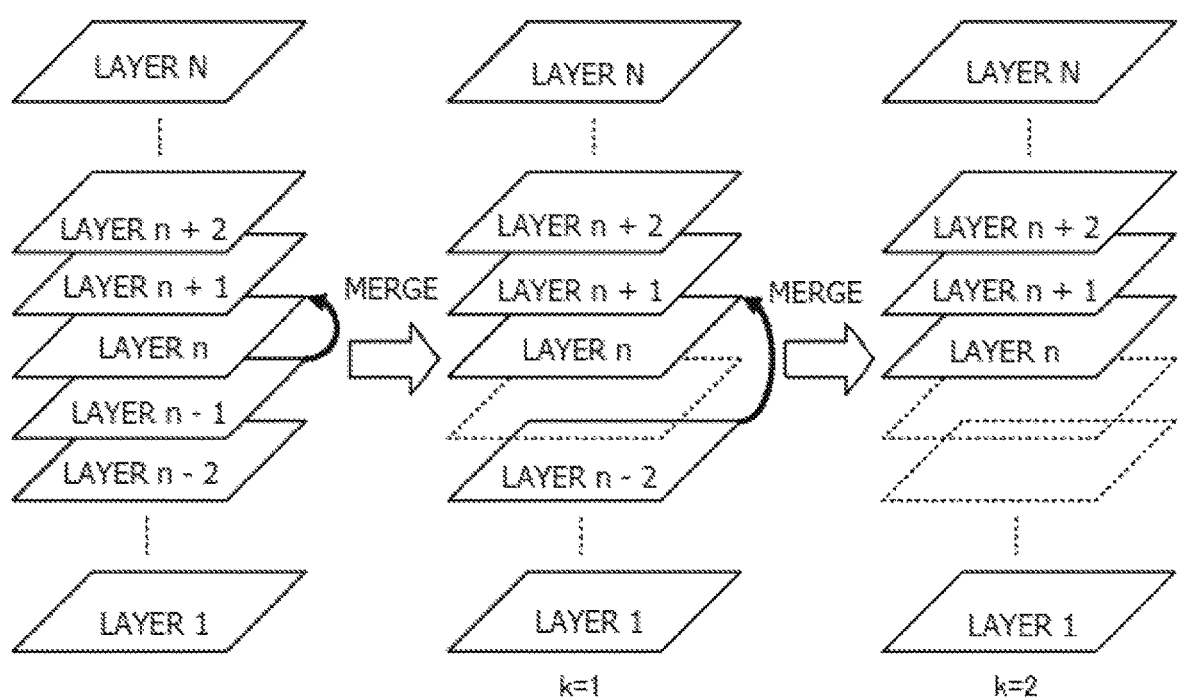
FIG. 17 is an explanatory drawing of the layer merge process illustrated in FIG. 16.

FIG. 17 is an explanatory drawing of the layer merge process illustrated in FIG. 16. On the left-hand side of FIG. 17, N layers 1 to N included in one page are illustrated. When the user performs the merge operation while specifying layer n, the processor 55 performs steps S122a and S123a illustrated in FIG. 16 under the condition that variable k equals 1. Accordingly, layer n−1 is merged into layer n and then layer n−1 is deleted. Subsequently, when the user performs the merge operation again, the processor 55 performs steps S122a and S123a illustrated in FIG. 16 under the condition that variable k equals 2. Accordingly, layer n−2 is merged into layer n and then layer n−2 is deleted. As above, in the second and subsequent merge operations, the user can successively combine layers one by one upward by just performing the merge operation without the need for specifying a layer. Thus, also with this modification, it becomes possible to successively combine layers afterwards by an easy method.

As described above, according to this embodiment, it becomes possible to address various challenges regarding a pen tablet 1 operating in two operation modes: the tablet mode and the paper mode. Accordingly, it becomes possible to provide a pen tablet 1 operating in two operation modes: the tablet mode and the paper mode.

Specifically, it is determined whether or not communication with the device driver 50a executed by the external computer 10 is requested of the communicator 42 illustrated in FIG. 2. When communication with the device driver 50a is requested, the pen tablet 1 operates in the tablet mode of supplying the hover coordinates and the contact coordinates to the device driver 50a. When communication with the device driver 50a is not requested, the pen tablet 1 operates in the paper mode of discarding at least part of the hover coordinates and recording the stroke data generated based on the contact coordinates in the memory 43. Therefore, it becomes possible to avoid exhausting the capacity of the memory 43 with the hover coordinates when the pen tablet 1 is operated also as a handwritten data recording device for supplying handwritten data to the computer 10.

Further, since it becomes possible to record the stroke data while classifying consecutive strokes into subgroups (provisional layers) in a group (page), recording of stroke data sets in finer classification than pages becomes possible. Thus, in the computer 20 executing the handwritten data drawing method upon receiving the stroke data, it becomes possible to realize operations convenient for the user, such as deleting stroke data included in a given subgroup all at once, generating a layer by merging stroke data sets belonging to two or more subgroups together, and so forth.

Furthermore, by the layer editing process according to the present disclosure, the first and second synthetic image data are generated prior to the editing operation on layer n. Therefore, the load on the computer 20 is lightened when processing handwritten data having a layer structure.

Moreover, by the layer merge process according to the present disclosure, it becomes possible to combine handwritten data into one page or layer on the computer 20's side.

While preferred embodiments of the present invention has been described above, the present invention is not limited to the particular illustrative embodiments. The present invention can be implemented in a variety of styles within the scope not departing from the subject matter of the invention.

For example, while the pen tablet 1 according to the above embodiments was configured to discard all the hover coordinates (step S23 in FIG. 4) in the paper mode, it is also possible to record part or all of the hover coordinates in the paper mode when the memory 43 has sufficient storage space in reserve, for example.

Further, while the pen tablet 1 according to the above embodiments was configured to record the detected coordinates X and Y directly in the memory 43 as part of the coordinate data, that is, the stroke data was formed of a set of consecutive contact coordinates, the pen tablet 1 may also be configured to perform an interpolation process and record control points obtained by the interpolation process in the memory 43 instead of the coordinates X and Y themselves. The stroke data in this case is a set of data obtained by processing a set of consecutive contact coordinates.

The invention claimed is:

1. A pen tablet capable of detecting a position of a stylus and supplying positional coordinates to an external computer, comprising:
    a detector that identifies and detects whether the stylus is in a contact state in which the stylus contacts a sensor surface or in a hover state in which the stylus moves over the sensor surface without contacting the sensor surface, and generates hover coordinates as the positional coordinates of the stylus in the hover state and contact coordinates as the positional coordinates of the stylus in the contact state;
    a communicator that performs communication with a device driver and a given application, wherein the device driver and the given application are executed by the external computer;
    a storage device; and
    a controller that performs
        determining whether or not the communication with the device driver is requested,
        operating in a first mode, for supplying the hover coordinates and the contact coordinates to the external computer, when the communication with the device driver executed by the external computer is requested, and
        operating in a second mode, for not recording at least part of the hover coordinates in the storage device and recording stroke data generated based on the contact coordinates in the storage device, without supplying the hover coordinates and the contact coordinates to the external computer, when the communication with the device driver executed by the external computer is not requested.

2. The pen tablet according to claim 1, wherein the controller discards all of the hover coordinates when operating in the second mode.

3. The pen tablet according to claim 1, wherein the controller operates in the second mode when the communicator is connected to no external computer.

4. The pen tablet according to claim 1, wherein
    while operating in the second mode, the controller further determines whether or not communication is performed with a handwritten data drawing program executed by the external computer, and
    the contact coordinates are transmitted to the handwritten data drawing program when transmission of the stroke data is requested by the handwritten data drawing program.

5. The pen tablet according to claim 4, wherein the communicator is formed of a plurality of communicators including a first communicator that performs communication with the device driver and a second communicator that performs communication with the handwritten data drawing program.

6. The pen tablet according to claim 1, wherein the detector identifies whether the stylus is in the hover state or in the contact state based on a pen pressure value transmitted from the stylus.

7. A handwritten data recording device used with a stylus, comprising:
    a detector that detects whether or not the stylus is in a contact state and generates contact coordinates representing a position of the stylus in the contact state;
    a storage device;
    an operational element that receives a first operation for updating a group of stroke data and a second operation for updating a subgroup of stroke data as a subset of the group; and a processor that performs
  generating first stroke data, belonging to a first group and a first subgroup as a subset of the first group, and second stroke data successively after generating the first stroke data,
  associating the second stroke data with the first group and the first subgroup when neither the first operation nor the second operation is received by the operational element after the start of generating the first stroke data and before the start of generating the second stroke data,
  associating the second stroke data with a second group different from the first group and a second subgroup as a subset of the second group when the first operation is received by the operational element after the start of generating the first stroke data and before the start of generating the second stroke data, and
  associating the second stroke data with the first group and a third subgroup which is a subset of the first group and different from the first subgroup when the second operation is received by the operational element after the start of generating the first stroke data and before the start of generating the second stroke data.

8. The handwritten data recording device according to claim 7, wherein
  the second group is a new group different from any group existing before the processor associates the second stroke data with a group,
  the second subgroup is a new subgroup different from any subgroup existing before the processor associates the second stroke data with a subgroup, and
  the third subgroup is a new subgroup different from any subgroup existing before the processor associates the second stroke data with a subgroup.

9. The handwritten data recording device according to claim 7, wherein
  the group is a page,
  the subgroup is a layer,
  the first operation is a page break operation, and
  the second operation is a layer break operation.

10. The handwritten data recording device according to claim 8, wherein
  when the second stroke data is associated with the first group by the processor, the first and second stroke data are superimposed together and displayed in a same pixel region by an external computer, and
  when the second stroke data is associated with the second group by the processor, the first and second stroke data are displayed in pixel regions different from each other by the external computer.

11. The handwritten data recording device according to claim 10, wherein when the second stroke data is associated with the third subgroup by the processor, the first and second stroke data are superimposed together and displayed in the same pixel region by the external computer by performing a synthesis calculation for overlaying the second stroke data on a first image generated based on the first stroke data.

12. The handwritten data recording device according to claim 7, wherein the processor performs
  accumulating the contact coordinates in the storage device in chronological order,
  associating the second stroke data with the second group and the second subgroup by recording a first event corresponding to the first operation in the storage device between a series of contact coordinates corresponding to the first stroke data and a series of contact coordinates corresponding to the second stroke data when the first operation is received by the operational element after the start of generating the first stroke data and before the start of generating the second stroke data, and
  associating the second stroke data with the first group and the third subgroup by recording a second event corresponding to the second operation in the storage device between the series of contact coordinates corresponding to the first stroke data and the series of contact coordinates corresponding to the second stroke data when the second operation is received by the operational element after the start of generating the first stroke data and before the start of generating the second stroke data.

13. The handwritten data recording device according to claim 7, wherein
  the operational element includes a button, and
  the processor determines which of the first and second operations is received by the operational element based on a user's manner of depressing the button.

14. The handwritten data recording device according to claim 7, wherein the processor is configured to accumulate the contact coordinates in the storage device while associating the contact coordinates with time stamp information indicating a time when the contact coordinates were generated or an ordinal number indicating order of generation of a series of the contact coordinates.

15. The handwritten data recording device according to claim 7, wherein the stroke data is a set of consecutive contact coordinates or a set of data obtained by processing a set of consecutive contact coordinates.

16. A handwritten data drawing method to be executed by a computer performing a drawing method based on coordinate data corresponding to a position of a stylus according to stroke data supplied from a handwritten data recording device, wherein
  the handwritten data recording device includes
    a detector that detects a coordinate data set corresponding to positions indicated by the stylus from when the stylus is in contact with the detector to when the stylus is separated from the detector,
    a nonvolatile memory,
    an operational element that receives a first operation corresponding to a group of stroke data in units of the coordinate data sets and a second operation corresponding to a subgroup as a subset of the group, and
    a processor that accumulates the coordinate data sets detected by the detector in the nonvolatile memory while successively generating, based on the coordinate data sets accumulated in the nonvolatile memory, first stroke data, belonging to a first group and a first subgroup as a subset of the first group, and second stroke data,
  wherein the processor performs
    associating the second stroke data with the first group and the first subgroup when neither the first operation nor the second operation is received by the operational element after the start of generating the first stroke data and before the start of generating the second stroke data,
    associating the second stroke data with a second group different from the first group and a second subgroup as a subset of the second group when the first operation is received by the operational element after the start of generating the first stroke data and before the start of generating the second stroke data, and associating the second stroke data with the first group and a third subgroup which is a subset of the first group and different from the first subgroup when the first operation is not received but the second operation is received by the operational element after the start of generating the first stroke data and before the start of generating the second stroke data, and the handwritten data drawing method comprises:

a step of establishing communication between the computer and the handwritten data recording device;

a step of, by the computer, acquiring the first and second stroke data and the group and the subgroup associated with each of the first and second stroke data from the handwritten data recording device using the communication;

a step of, by the computer, generating first image data by rendering the first stroke data;

a step of, by the computer, generating second image data by rendering the second stroke data; and a step of, by the computer, performing a drawing process so as to overlay the second image data on the first image data when both of the first and second stroke data belong to the first group or performing a drawing process for only the first or second image data when the first stroke data belongs to the first group and the second stroke data belongs to the second group.

17. The handwritten data drawing method according to claim 16, wherein the group is a page, the subgroup is a layer, and the handwritten data drawing method further comprises:

a step of acquiring stroke data sets respectively belonging to N layers from a first layer generated the earliest in time to an N-th layer generated the last in time;

a step of receiving specification of an n-th layer included in the N layers;

a first aggregation step of generating first synthetic image data by rendering stroke data sets included in all layers generated before the n-th layer in time;

a second aggregation step of generating second synthetic image data by rendering stroke data sets included in all layers generated after the n-th layer in time; and a rendering step of performing rendering of the N layers upon each detection of an editing operation on the n-th layer, the rendering step includes a step of generating edited image data by performing the detected editing operation on the stroke data set belonging to the n-th layer, and a step of performing drawing of the N layers by overlaying the edited image data on the first synthetic image data and overlaying the second synthetic image data on the image obtained as a result of said overlaying.

18. The handwritten data drawing method according to claim 17, wherein the first aggregation step generates the first synthetic image data by rendering a set of stroke data included in each of all layers respectively generated before the n-th layer in time in the order of generation of the stroke data, and the second aggregation step generates the second synthetic image data by rendering a set of stroke data included in each of all layers respectively generated after the n-th layer in time in the order of generation of the stroke data.

19. The handwritten data drawing method according to claim 18, wherein the step of generating the edited image data includes deletion of stroke data in the stroke data set included in the n-th layer or addition of new stroke data to the n-th layer.

20. A handwritten data synthesis method comprising:

a step of acquiring stroke data sets respectively belonging to N layers from a first layer generated the earliest in time to an N-th layer generated the last in time;

a step of receiving specification of an n-th layer included in the N layers;

a step of receiving a merge operation; and a layer synthesis step of merging the stroke data set of the n-th layer into the stroke data set of an (n−1)-th layer while maintaining an ordinal relationship and deleting and the n-th layer, wherein when the merge operation is received again without receiving specification of an n-th layer included in the N layers after performing the layer synthesis step, the merged stroke data set of the (n−1)-th layer is merged into the stroke data set of an (n−2)-th layer while maintaining an ordinal relationship and the (n−1)-th layer is deleted.

* * * * *